(12) United States Patent
Sohmshetty et al.

(10) Patent No.: US 11,981,226 B2
(45) Date of Patent: May 14, 2024

(54) SWAPPABLE BATTERY SYSTEM

(71) Applicant: FORD GLOBAL TECHNOLOGIES, LLC, Dearborn, MI (US)

(72) Inventors: Rajashekar Sohmshetty, Canton, MI (US); Archana Sohmshetty, Canton, MI (US); Ajay Sohmshetty, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 869 days.

(21) Appl. No.: 16/630,320

(22) PCT Filed: Jul. 19, 2018

(86) PCT No.: PCT/US2018/042943
§ 371 (c)(1),
(2) Date: Jan. 10, 2020

(87) PCT Pub. No.: WO2019/018679
PCT Pub. Date: Jan. 24, 2019

(65) Prior Publication Data
US 2020/0164760 A1    May 28, 2020

Related U.S. Application Data

(60) Provisional application No. 62/543,883, filed on Aug. 10, 2017, provisional application No. 62/536,897, (Continued)

(51) Int. Cl.
*B60L 53/80* (2019.01)
*B60L 50/60* (2019.01)
(Continued)

(52) U.S. Cl.
CPC ............... *B60L 53/80* (2019.02); *B60L 50/64* (2019.02); *B60L 50/66* (2019.02); *B60L 53/36* (2019.02);
(Continued)

(58) Field of Classification Search
CPC .......... B60L 53/80; B60L 50/64; B60L 50/66; B60L 53/36; B60L 53/53; B60L 53/67;
(Continued)

(56) References Cited

U.S. PATENT DOCUMENTS 5,373,910 A   12/1994  Nixon
5,542,488 A   8/1996   Nixon
(Continued)

FOREIGN PATENT DOCUMENTS

CN   205633053 U   10/2016
CN   106081163 A   11/2016
(Continued)

OTHER PUBLICATIONS

Search Report dated Oct. 15, 2018 for International Application No. PCT/US2018/042943 filed Jul. 19, 2018, 3 pages.
(Continued)

*Primary Examiner* — Elim Ortiz
(74) *Attorney, Agent, or Firm* — Vichit Chea; Brooks Kushman P.C.

(57) ABSTRACT

Systems and methods for implementing a battery swapping system for an electrically powered vehicle. The vehicle includes a propulsion system, a first battery powering the propulsion system, and another power source powering the propulsion system. The vehicle further includes a controller configured to enable unloading the first battery to a first charging station by propulsion of the vehicle towards and then away from the first charging station. The controller is further configured to subsequently enable loading a second
(Continued)

battery from a second charging station by propulsion of the vehicle powered by the another power source towards the second charging station.

20 Claims, 10 Drawing Sheets

Related U.S. Application Data filed on Jul. 25, 2017, provisional application No. 62/534,640, filed on Jul. 19, 2017.

(51) Int. Cl.
| | |
|---|---|
| *B60L 50/64* | (2019.01) |
| *B60L 53/36* | (2019.01) |
| *B60L 53/53* | (2019.01) |
| *B60L 53/67* | (2019.01) |
| *B60L 58/10* | (2019.01) |
| *B64C 39/02* | (2023.01) |
| *B64D 27/24* | (2006.01) |
| *B64F 5/40* | (2017.01) |
| *H01M 10/44* | (2006.01) |
| *H01M 50/262* | (2021.01) |
| *B64U 50/19* | (2023.01) |

(52) U.S. Cl.
CPC .............. *B60L 53/53* (2019.02); *B60L 53/67* (2019.02); *B60L 58/10* (2019.02); *B64C 39/024* (2013.01); *B64D 27/24* (2013.01); *B64F 5/40* (2017.01); *H01M 10/441* (2013.01); *H01M 50/262* (2021.01); *B60L 2200/10* (2013.01); *B64U 50/19* (2023.01); *H01M 2220/20* (2013.01)

(58) Field of Classification Search
CPC .. B60L 58/10; B60L 2200/10; B60L 2240/70; B60L 53/305; B60L 53/66; B64C 39/024; B64C 2201/042; B64C 2201/18; B64C 2201/146; B64D 27/24; B64D 1/10; B64D 1/12; B64F 5/40; H01M 10/441; H01M 50/20; H01M 2220/20; H01M 50/262; B60K 2001/0416; B60K 2001/0477; B60K 1/04; B60Y 2200/10; Y02E 60/10; Y02T 10/70; Y02T 10/7072; Y02T 90/12

See application file for complete search history.

(56) References Cited

U.S. PATENT DOCUMENTS

| | | | |
|---|---|---|---|
| 5,760,569 A | 6/1998 | Chase | |
| 7,201,384 B2 | 4/2007 | Chaney | |
| 8,164,300 B2 | 4/2012 | Agassi et al. | |
| 8,852,794 B2* | 10/2014 | Laitinen | H01M 50/204 |
| | | | 429/149 |
| 9,139,310 B1 | 9/2015 | Wang | |
| 9,434,267 B2 | 9/2016 | Wang et al. | |
| 9,499,265 B2 | 11/2016 | Sanz et al. | |
| 9,527,605 B1 | 12/2016 | Gentry et al. | |
| 9,550,582 B2 | 1/2017 | Wang | |
| 9,551,989 B2 | 1/2017 | Scarlatti et al. | |
| 9,688,252 B2* | 6/2017 | Gaffoglio | B60L 53/80 |
| 9,783,075 B2* | 10/2017 | Henry | B64F 1/007 |
| 9,862,285 B2 | 1/2018 | Lee et al. | |
| 10,464,431 B2 | 11/2019 | Ger | |
| 10,807,492 B1* | 10/2020 | Holland | B60L 53/60 |
| 2009/0058355 A1 | 3/2009 | Meyer | |
| 2011/0044791 A1 | 2/2011 | Agassi et al. | |
| 2011/0140658 A1* | 6/2011 | Outwater | B60L 53/35 |
| | | | 320/109 |
| 2015/0042158 A1 | 2/2015 | Schmidt | |
| 2015/0127479 A1* | 5/2015 | Penilla | B60L 53/68 |
| | | | 705/305 |
| 2016/0009255 A1 | 1/2016 | Droste | |
| 2016/0257424 A1 | 9/2016 | Stabler et al. | |
| 2016/0364989 A1 | 12/2016 | Speasl et al. | |
| 2017/0021942 A1 | 1/2017 | Fisher et al. | |
| 2017/0101263 A1 | 4/2017 | Schroer | |
| 2017/0129603 A1 | 5/2017 | Raptopoulos et al. | |
| 2017/0136631 A1 | 5/2017 | Li et al. | |
| 2017/0174091 A1 | 6/2017 | Miller et al. | |
| 2017/0253138 A1 | 9/2017 | Ger | |

FOREIGN PATENT DOCUMENTS

| | | |
|---|---|---|
| CN | 104973263 B | 3/2017 |
| CN | 206123109 U | 4/2017 |
| CN | 106864751 A | 6/2017 |
| CN | 105836149 B | 11/2017 |
| GB | 2551055 A | 12/2017 |
| KR | 101705838 B1 | 2/2017 |
| KR | 101765038 B1 | 8/2017 |
| KR | 101765040 B1 | 8/2017 |
| WO | 2016086274 A1 | 6/2016 |
| WO | 2016130112 A1 | 8/2016 |
| WO | 2016137982 A1 | 9/2016 |
| WO | 2017029611 A1 | 2/2017 |
| WO | 2017138803 A1 | 8/2017 |

OTHER PUBLICATIONS

"Switching Batteries From Series to Parallel—Technical Solution", https://engineering.stackexchange.com/question/1905/switching-batteries-from-series-to-parallel-technical-solution, May 15, 2020, pp. 1-7.
"Switching Circuits for Selecting Between Series or Parallel Operation of Various Electrical Devices", https://midmagic.sgc-hosting.com/separcir.htm, May 15, 2020, pp. 1-6.
Robert Williams, "Bravo's 'Top Chef' partners with Postmates for robot food delivery," Mobile Marketer, Dec. 7, 2017, 3 pages.
Michael Hemsworth, "Urban Parcel Delivery Robots: the 'Cifu' is a friendly unit for dropping off packages," Trend Hunter: Create the Future, Dec. 1, 2017, 2 pages.
"Eliport Autonomous ground-based delivery robots," StartEngine, Barcelona, Spain, Feb. 2018, 16 pages.
Cristina Digiacomo, "E-Novia's YAPE is the latest in growing crop of self-driving delivery robots," PSFK LLC, New York, NY, Jan. 8, 2018, 5 pages.
"Fujitsu office delivery robot," Robotics Today, 2018, 2 pages.
Li Dongmei, "JD.com launches robot delivery services in Chinese universities," China Money Network, Jan. 19, 2017, 2 pages.
Bruce Rutledge, "Little red sushi delivery robots to debut in Japan," North American Post, Jul. 28, 2017, 2 pages.
"Panasonic autonomous delivery robots—HOSPI—aid hospital operations at Changi general hospital," Panasonic, Singapore, Jul. 23, 2015, 4 pages.
Bilal Ahmed, "Quadrotor drone battery swapping station," Mar. 6, 2018, 5 pages.
"Startup Nuro unveils a robot delivery van for e-commerce packages," Bloomberg News, Jan. 31, 2018, 7 pages.
Rosie Taylor, et al., "Tesco makes UK's first delivery by ROBOT in trial that could change shopping forever," News Group Newspapers Ltd, London, May 31, 2017, 8 pages.
Thuy Ong, "The first autonomous drone delivery network will fly above Switzerland starting next month," The Verge, Sep. 20, 2017, 5 pages.
"TI technology extends flight time and battery life of quadcopters and industrial drones," Texas Instruments, Jan. 17, 2017, 3 pages.
"Automating the last mile: Startups chasing robot delivery by land and air," CB Information Services Inc., Mar. 30, 2017, 8 pages.
MIT Lab Drone Battery Swap: https://www.youtube.com/watch?v=jltFEaWz0V0&feature=youtu.be.
"Just stop and swap," Asylon Stopswap.soar, 4 pages.

(56) References Cited

OTHER PUBLICATIONS

"Tesla Model S weight distribution," Teslarati, Jul. 19, 2013, 7 pages.
Monica Nickelsburg "Amazon's latest crazy drone idea: Charging and repair stations on roaming cars, boats and trucks," GeekWire, Aug. 7, 2017, 10 pages.
Robert Best "Domino's invests in a global fleet of pizza delivery robots," Infotech Solutions (UK) Ltd, Apr. 26, 2017, 7 pages.
Kiwibot, food delivery robot: https://www.kiwibot.com/.
April Glaser, "Ohio is now the fifth U.S. state to permit delivery robots on sidewalks: Starship Technologies helped to pass the Ohio law," Vox Media, LLC, Jul. 5, 2017.
Hlylio develops cutting edge drone technology to deliver the ultimate performance in aerial crop spraying: https://www.hyl.io.
Asylon: DroneCore an aerial infrastructure company: https://dronecore.us/.
Airbotics, Automated industrial drones: https://www.airoboticsdrones.com/#/solution.
Yoram Solomon "Why Drones Actually Can't Deliver Packages to Homes: The new FAA rules that allow commercial use of drones still won't allow Amazon's package delivery plans. The FAA is not the real problem. The laws of physics are," Mansueto Ventures, Inc., Aug. 9, 2016, 5 pages.

\* cited by examiner

SWAPPABLE BATTERY SYSTEM

CROSS-REFERENCE TO RELATED APPLICATIONS

This application is the National Phase of PCT/US2018/042943, filed Jul 19, 2018, which claims the benefit of U.S. Provisional Application No. 62/543,883, filed Aug. 10, 2017, U.S. Provisional Application No. 62/536,897, filed Jul. 25, 2017, and U.S. Provisional Application 62/534,640, filed Jul. 19, 2017, the disclosures of all of which are hereby incorporated in their entirety by reference herein.

TECHNICAL FIELD

Aspects of this disclosure generally relate to loading and unloading batteries that power an electric motor of a vehicle.

BACKGROUND

As a vehicle propelled by an electric motor is operated, a battery of the vehicle is discharged to power the electric motor. When the battery is fully discharged, the electric motor can no longer function to propel the vehicle using the battery. Such vehicles thus need a mechanism by which to obtain additional electrical energy to remain operable via the electric motor.

SUMMARY

In one exemplary embodiment, a vehicle includes a propulsion system, a first battery and another power source powering the propulsion system, and a controller. The controller is configured to enable unloading the first battery to a first charging station by propulsion of the vehicle towards and then away from the first charging station. The controller is further configured to subsequently enable loading a second battery from a second charging station by propulsion of the vehicle powered by the another power source towards the second charging station.

In another exemplary embodiment, a method for operating a vehicle including a first battery and another power source powering a propulsion system includes docking and unloading the first battery to a first charging station by propulsion of the vehicle towards and then away from the first charging station, and subsequently docking and loading a second battery onto the vehicle from a second charging station by propulsion of the vehicle using the another power source towards the second charging station.

In a further exemplary embodiment, the vehicle includes a propulsion system and a battery swapping system including a first battery and another power source powering the propulsion system. The battery swapping system is configured to engage and unload the first battery to a first charging station responsive to a propulsion towards and then away from the first station. The battery swapping system is further configured to subsequently engage and load a second battery from a second charging station responsive to a propulsion using the another power source towards the second station.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Inconveniences such as restricted battery capacities and long charging times have limited widespread adoption of electrically powered vehicles, such as automobiles, robots, unmanned aerial vehicles (UAVs) (e.g., drones), and watercrafts. For example, fully recharging a battery of an electrically powered vacuum robot may take several hours or overnight, and may only provide about forty minutes worth of cleaning. If forty minutes is not adequate for cleaning a given area assigned to the vacuum robot, then a user may need to wait hours before the robot is able to finish cleaning the area. As a further example, a battery of an electrically powered automobile coupled to a supercharging station may take up to seventy-five minutes to fully recharge, which may not be practical during long road trips or when a driver has back-to-back appointments. Moreover, public charging stations for electrically powered automobiles are up to sixteen times slower than such supercharging stations, the latter of which are relatively limited in number and expensive to operate.

As another example, UAVs are often utilized as elements of last mile delivery systems, and are particularly suitable for delivery in rural areas where distances may be great, paved pathways do not always exist, and accessibility to high value items like medicines may be limited. However, UAVs require long charging times for relatively short flights. A typical charging to usage time for a UAV is sixteen to one. In other words, a UAV typically needs to be recharged for four hours for fifteen minutes of flight time. Similar challenges exist for autonomous robotic vehicles for delivering goods.

Figure 1:
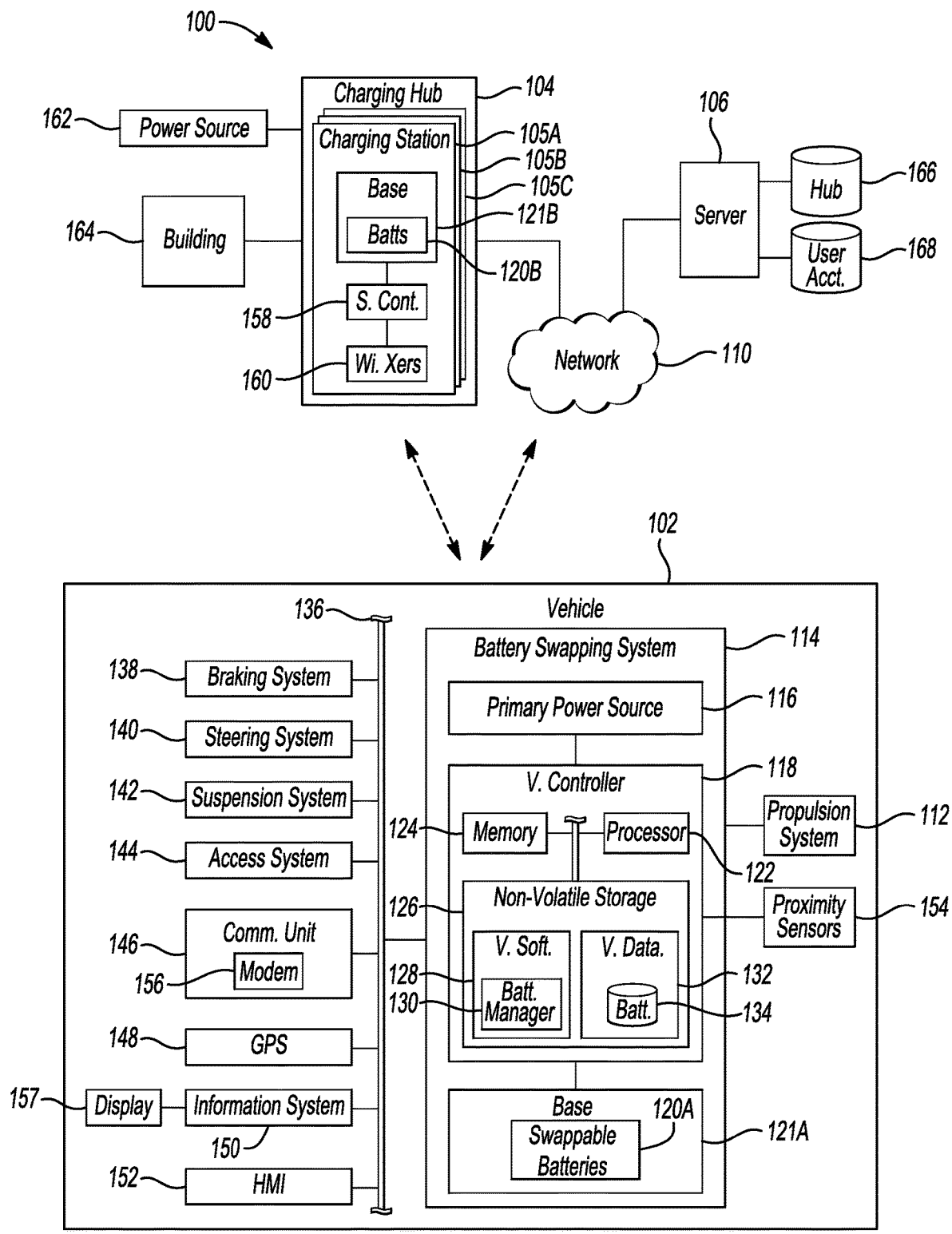
FIG. 1 is a schematic diagram of an exemplary system for swapping batteries of an electrically powered vehicle.

FIG. 1 illustrates a system 100 that helps overcome these and other obstacles by providing a simple, cost effective, and scalable solution for swapping batteries between an electrically powered vehicle 102 and a charging hub 104. When an electrically powered vehicle 102 needs additional electrical power, such as because the vehicle 102 is running low or does not have enough power to reach a desired destination, the vehicle 102 may locate a nearby charging hub 104. The charging hub 104 may include several charging stations 105 (e.g., charging stations 105A, 105B, 105C), each being capable of receiving batteries from the vehicle 102, charging the received batteries, and loading the batteries onto another vehicle. Each of the charging stations 105 may be able to perform these functions by leveraging the propulsion capabilities of the vehicle 102, thereby reducing the cost and complexity of implementing the system 100.

Specifically, responsive to arriving at the charging hub 104, the vehicle 102 or driver of the vehicle 102 may determine which of the charging stations 105 (e.g., charging station 105A) to unload one or more batteries of the vehicle 102, and which of the charging stations 105 (e.g., charging station 105B) includes fully charged batteries that can be loaded to power the vehicle 102. Responsive to determining the charging station 105A in which to unload one or more batteries, the vehicle 102 may perform a propulsion towards the charging station 105A that docks the vehicle 102, or more particularly the one or more batteries of the vehicle 102, to the charging station 105A. Once the vehicle 102 is docked, the one or more batteries of the vehicle 102 to be unloaded may receive at least one command signal, such as from the vehicle 102 or the charging station 105A, that causes the one or more batteries to lock to the charging station 105A and unlock from vehicle 102. Thereafter, the vehicle 102 may perform a propulsion away from the charging station 105A, such as using another power source of the vehicle 102, which may disengage the vehicle 102 from the charging station 105A so that the vehicle 102 may dock with and load a battery from another charging station 105B.

Thus, subsequent to the propulsion away from the charging station 105A, the vehicle 102 may perform a propulsion towards another charging station 105B of the charging hub 104 that has one or more charged batteries. Similar to before, the propulsion towards the another charging station 105B may cause the vehicle 102 to dock the another charging station 105B, or more particularly to dock the one or more charged batteries of the another charging station 105B. Once the vehicle 102 is docked, the one or more charged batteries may receive at least one command signal, such as from the vehicle 102 or the another charging station 105B, that causes the one or more charged batteries to lock to the vehicle 102 and unlock from the another charging station 105B. Responsive to the one or more charged batteries being locked to the vehicle 102, the one or more charged batteries may be coupled to and able to power a propulsion system of the vehicle 102. The vehicle 102 may then perform a propulsion away from the another charging station 105B to disengage from the another charging station 105B with the one or more charged batteries now loaded and powering the propulsion system of the vehicle 102. Unlike waiting for installed batteries of the vehicle 102 to be recharged, the swapping of batteries described above may take place in a matter of minutes.

The system 100 may include the electrically powered vehicle 102, the charging hub 104, and a server 106. Each of these system 100 components may communicate with one or more of the other components directly and/or over the network 110. The network 110 may include one or more interconnected communication networks, such as one or more of the Internet, a cable television distribution network, a satellite link network, a local area network, a wide area network, and a telephone network.

The vehicle 102 may include a propulsion system 112 powered by one or more electric motors. Each of the electric motors may be configured to convert electricity into mechanical energy to propel the vehicle 102. Specifically, the propulsion system 112 may include propulsion devices that, responsive to receiving the mechanical energy from the electric motors, interact with the environment surrounding the vehicle 102 to propel the vehicle 102 in a given direction. As some non-limiting examples, the propulsion devices may include tires that propel the vehicle 102 across surfaces and/or propellers that propel the vehicle 102 aerially or through water.

The vehicle 102 may be a fully electric vehicle, in which case the propulsion system 112 may include electric motors alone. Alternatively, the vehicle 102 may be a hybrid electric vehicle, in which case the propulsion system 112 may include one or more electric motors and one or more of another type of propulsion generator, such as an internal combustion engine. The vehicle 102 may further be an autonomous vehicle. As some non-limiting examples, the vehicle 102 may be an electric automobile, a hybrid electric automobile, a UAV, a watercraft such as a submarine, or a robot.

The vehicle 102 may also include a battery swapping system 114 coupled to the propulsion system 112, or more particularly to the propulsion generators (e.g., electric motors, internal combustion engines) of the propulsion system 112. The battery swapping system 114 may be configured to dock with and unload one or more batteries to a charging station 105, such as charging station 105A, responsive to a propulsion of the vehicle 102 towards and then away from the charging station 105A. Subsequently, the battery swapping system 114 may be configured to dock with and load one or more batteries from a different charging station 105, such as charging station 105B, responsive to a propulsion of the vehicle 102 powered by another power source towards and then away from the charging station 105B.

The battery swapping system 114 may include a primary power source 116, a vehicle controller 118, and one or more swappable batteries 120A. The swappable batteries 120A may be electrically connected and arranged in a stacked configuration, with one end of the stack being locked to a battery base 121A of the battery swapping system 114. The battery base 121A may electrically couple the stack of electrically connected batteries 120A to other components of the vehicle 102, such as the vehicle controller 118 and the propulsion system 112. During operation of the vehicle 102, the primary power source 116 and the swappable batteries 120A may each power one or more propulsion generators of the propulsion system 112 so as to enable them to generate the mechanical energy that propels the vehicle 102. For example, the primary power source 116 may be a fuel tank configured to provide gasoline to one or more internal combustion engines of the propulsion system 112. Alternatively, the primary power source 116 may be a battery configured to provide electricity to one or more electric motors of the propulsion system 112. The swappable batteries 120A may similarly be configured to provide electricity to one or more electric motors of the propulsion system 112. Unlike the primary power source 116, which may not be readily removable from the vehicle 102, the swappable batteries 120A may be configured for frequent unloading from and loading to the vehicle 102.

The battery swapping system 114, such as via operation of the vehicle controller 118, may also manage the rate at which the primary power source 116 and the swappable batteries 120A supply power to the propulsion system 112 so as to meet the current demands of the propulsion system 112. The primary power source 116 and the swappable batteries 120A may also power other components of the vehicle 102, and the vehicle controller 118 may likewise be configured to manage the supply of power to these components. The vehicle controller 118 may further monitor the status of the swappable batteries 120A, and identify when the vehicle 102 is running low on power, or whether the vehicle 102 has enough available power given a current goal of the vehicle 102 (e.g., enough power to reach a destination entered into a navigation system of vehicle 102 and then reach a charging hub 104). If additional power is needed, then the battery swapping system 114, such as via the vehicle controller 118, may be configured to dock and unload one or more depleted swappable batteries 120A to a charging station 105A via a propulsion of the vehicle 102 towards and then away from the charging station 105A, and subsequently load one or more charged swappable batteries (e.g., swappable batteries 120B) onto the vehicle 102 from a charging station 105B via a propulsion of the vehicle 102 powered by the primary power source 116 towards the charging station 105B. In this way, the vehicle 102 is able to quickly retrieve additional power via its own propulsion, without relying on significant movement by the charging stations 105, and without relying on long recharge periods in which the vehicle 102 needs to remain plugged into an external power source.

The vehicle controller 118 of the battery swapping system 114 may include a processor 122, memory 124, and non-volatile storage 126. The processor 122 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 124. The memory 124 may include a single memory device or a plurality of memory devices including, but not limited to, random access memory ("RAM"), volatile memory, non-volatile memory, static random-access memory ("SRAM"), dynamic random access memory ("DRAM"), flash memory, cache memory, or any other device capable of storing information. The non-volatile storage 126 may include one or more persistent data storage devices such as a hard drive, optical drive, tape drive, non-volatile solid-state device, or any other device capable of persistently storing information.

The processor 122 may be configured to read into memory 124 and execute computer-executable instructions embodied as vehicle software 128 residing in the non-volatile storage 126. This vehicle software 128 may include an operating system and applications, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The vehicle software 128 may be configured, upon execution by the processor 122, to cause the vehicle controller 118 to implement the functions, features, and processes of the vehicle controller 118 described herein.

For example, the vehicle software 128 may include computer-executable instructions that, upon execution of the processor 122, cause the vehicle controller 118 to implement a battery manager 130. The battery manager 130 may be configured to monitor the status (e.g., charge level) and position of each swappable battery 120A within the vehicle 102, and may be configured to enable the vehicle 102 to load and unload swappable batteries 120 to and from the vehicle 102 via propulsions of the vehicle 102 to and from the charging hub 104, such as by aligning the battery swapping system 114 of the vehicle 102 with a charging station 105, locking and unlocking swappable batteries 120 to and from the battery swapping system 114 of the vehicle 102, and locking and unlocking batteries 120 to and from charging stations 105 of the charging hub 104.

The non-volatile storage 126 of the vehicle controller 118 may also include vehicle data 132. The vehicle controller 118, upon execution of the vehicle software 128, may access the vehicle data 132 to provide the functions, features, and processes of the vehicle controller 118 described herein. For example, the vehicle data 132 may include a battery stack database 134 maintained by the battery manager 130. The battery stack database 134 may include a record for each swappable battery 120A included in the vehicle 102 that contains an identifier, address, type, current charge level, time and date added to the vehicle 102, and any other pertinent information about the swappable battery 120A. The battery manager 130 may utilize the information in the battery stack database 134 to identify at a given moment which swappable batteries 120A to discharge to power the propulsion system 112 and other vehicle 102 components, which swappable batteries 120A to charge from other swappable batteries 120A, and which swappable batteries 120A to unload onto a charging station 105.

The battery swapping system 114 may communicate with other components of the vehicle 102 either directly or over one or more in-vehicle networks 136. The in-vehicle networks 136 may include one or more of a vehicle controller area network (CAN), an Ethernet network, a media oriented system transfer (MOST) network, and an electrical grid for powering the other vehicle 102 components. Depending on the type of vehicle 102 (e.g., automobile, robot, UAV, watercraft), the other vehicle 102 components may include a braking system 138, a steering system 140, an active suspension system 142, an access system 144, a communications unit 146, a GPS module 148, an infotainment system 150, a human machine interface (HMI) 152, and proximity sensors 154. For example, while some types of vehicles 102, such as automobiles and robots, may include the braking system 138, steering system 140, and active suspension system 142, other types of vehicles 102, such as UAVs and watercrafts, may or may not include these systems, as the functions of these systems be implemented via the propulsion system 112 (e.g., propellers) of such vehicles 102. Although not shown, one or more of the other vehicle 102 components may each include a controller that is similar to the vehicle controller 118 and is configured, upon execution of software of the controller by a processor of the controller, to implement the features, functions, and processes of the component described herein.

The braking system 138 and the steering system 140 may work in conjunction with the propulsion system 112 to direct movement of the vehicle 102 from one location to another. Specifically, while the propulsion system 112 may be configured to propel the vehicle 102 in a given direction, the braking system 138 may be configured to decelerate the vehicle 102, and the steering system 140 may be configured to change a current heading of the vehicle 102. Each of these systems may be manually operated by a driver of the vehicle 102, such as via in-vehicle controls coupled to each of these systems. In addition, or alternatively, the vehicle 102 may operate these systems autonomously, such as at the direction of the vehicle controller 118.

The active suspension system 142 may be configured to raise and lower the vehicle 102, such as to place the swappable batteries 120A at a proper height to dock with a charging station 105 of a charging hub 104. Specifically, the active suspension system 142 may be configured to vertically adjust the rear of the vehicle 102, the front of the vehicle 102, and/or each corner of the vehicle 102 separately. Similar to the propulsion system 112, the braking system 138, and the steering system 140, the active suspension system 142 may be manually operated by a driver of the vehicle 102, such as via in-vehicle controls. In addition, or alternatively, the vehicle 102 may operate this system autonomously, such as at the direction of the vehicle controller 118.

The access system 144 may be configured to control access to the vehicle 102, such as by a driver or by a charging station 105 of the charging hub 104. For example, responsive to the vehicle 102 receiving a remote access command (e.g., unlock, lock, open trunk, start engine) from user via a wireless control device such as a key fob, the access system 144 may be configured to implement the command, such as by unlocking, locking, or remote starting the vehicle 102. As a further example, the swappable batteries 120A may be located behind a protective structure of the vehicle 102, such as a liftgate or sliding door. Responsive to the vehicle 102 moving within a predetermined distance of a charging station 105 of the charging hub 104, and/or to propelling to engage a charging station 105, the vehicle controller 118 may be configured to communicate a signal to the access system 144 that causes the access system 144 to remove the protective structure and thereby enable the swappable batteries 120A to dock with the charging station 105 via the propulsion of the vehicle 102 towards the charging station 105.

The communication unit 146 may be configured to facilitate wireless communication between the vehicle 102 components and other components of the system 100 over the network 110. The communication unit 146 may be configured to facilitate such wireless communication via radio frequency (RF) transmissions. The communication unit 146 may include a cellular modem 156 or other wireless network transceiver (e.g., Wi-Fi transceiver) configured to connect to the network 110, such as over a cellular network to which the cellular modem 156 is subscribed. The other vehicle 102 components may access the communication capabilities of the communication unit 146, and thereby communicate with other system 100 components over the network 110, via the in-vehicle networks 136.

The GPS module 148 of the vehicle 102 may be configured to identify vehicle 102 geographic data, such as via communicating with one or more satellites orbiting earth. The vehicle 102 geographic data may include a current location of the vehicle 102 (e.g., latitude and longitude coordinates), and may include a current heading of the vehicle 102, which may be derived from a changing location of the vehicle 102 over a time span, or from a compass of the vehicle 102. The GPS module 148 may be configured to provide the vehicle 102 geographic data to the other vehicle 102 components, such as the vehicle controller 118 and the infotainment system 150, automatically or on request.

The infotainment system 150 may be configured to provide entertainment and informational services to a user, such as via a GUI shown on a display 157 embedded in the vehicle 102 and driven by the infotainment system 150. For example, the infotainment system 150 may be configured to provide navigation based on geographic data received from the GPS module 148, radio, playing music from a connected mobile device, hands free telephone calling via a connected mobile device, voice command recognition, and vehicle applications based on data received from a connected mobile device or from the network 110. The infotainment system 150 may also be configured to illustrate vehicle information from other vehicle 102 components via the HMI 152 and/or the display 157, and/or receive input for the vehicle 102 components, including the infotainment system 150, via the HMI 152 and/or display 157, which may include a touch screen mechanism for receiving such user input. In other words, the infotainment system 150 may function as a gateway between the user and one or more of the other vehicle 102 components, and may be configured, responsive to receiving user input for a given vehicle 102 component, to communicate the user input to the given vehicle 102 component for processing.

The HMI 152 may facilitate user interaction with the other vehicle 102 components. The HMI 152 may include one or more video and alphanumeric displays, a speaker system, and any other suitable audio and visual indicators capable of providing data from the other vehicle 102 components to the user. The HMI 152 may also include a microphone, physical controls, and any other suitable devices capable of receiving input from a user to invoke functions of the other vehicle 102 components. The physical controls may include an alphanumeric keyboard, a pointing device (e.g., mouse), keypads, pushbuttons, and control knobs. As a specific example, the physical controls may include steering wheel audio buttons, a push-to-talk button, instrument panel controls, and the like. A display of the HMI 152 may also include a touch screen mechanism for receiving user input. Responsive to receiving user input for a given vehicle 102 component, the HMI 152 may be configured to communicate the user input to the given vehicle 102 component for processing.

The proximity sensors 154 of the vehicle 102 may be configured to detect objects proximate the vehicle 12, and to generate proximity data indicative of the position of the proximate objects relative to the vehicle 102, or more particularly to the battery swapping system 114. As an example, the proximity sensors 154 may include one or more of LIDAR sensors, cameras, radar sensors, ultrasonic sensors, and/or any other sensors for detecting information about the surroundings of the vehicle 12. The proximity sensors 154 may be mounted in one or more places on the vehicle 102. For example, a proximity sensor 154 may be mounted on a roof of the vehicle 102 so as to have a three hundred sixty-degree view of the environment surrounding of the vehicle 102. Additionally, or alternatively, various proximity sensors 154 may surround the vehicle 102 to provide a three hundred sixty-degree view around the vehicle 102. The vehicle 102 may include actuators for adjusting an angle of the field of view of the various proximity sensors 154. Based on the proximity data, the vehicle controller 118 may be configured to determine whether the vehicle 102, or more particularly the battery swapping system 114 of the vehicle 102, is in alignment with a charging station 105 during a propulsion to dock the charging station 105, and/or whether the vehicle 102 is fully docked with the charging station 105.

Responsive to receiving the proximity data from the proximity sensors 154, the vehicle controller 118 may be configured, based on the proximity data, to provide guidance to a driver when propelling to dock the battery swapping system 114 with a charging station 105, or to autonomously propel the vehicle 102 to dock the battery swapping system 114 with the charging station 105. As an example, when a driver performs a propulsion towards a charging station 105 of the charging hub 104 to dock the swappable batteries 120A with the charging station 105, the vehicle controller 118 may, based on the proximity data indicating the position of the charging station 105 relative to the vehicle 102, provide guidance to the driver for aligning with the charging station 105. For instance, the vehicle controller 118 may cause the display 157 and/or HMI 152 to show video of the charging station 105, to illustrate graphical objects indicating alignment adjustments that need to be made by the driver to dock with the charging station 105, and play sounds indicating needed alignment adjustments (e.g., a faster beep may indicate out of alignment). As a further example, the vehicle controller 118 may autonomously operate one or more of the propulsion system 112, braking system 138, steering system 140, active suspension system 142, and access system 144 of the vehicle 102 based on the proximity data to automatically dock battery swapping system 114 with the charging station 105 with little or no driver intervention.

As previously described, the charging hub 104 may include several charging stations 105, each being capable of holding batteries 120B previously unloaded from a vehicle 102, charging the held batteries 120B, and loading the held batteries 120B onto another vehicle responsive to the vehicle docking its battery swapping system 114 with the charging station 105 via a propulsion towards the charging station 105. Similar to the swappable batteries 120A, the batteries 120B of each charging station 105 may be in a stacked configuration, where one end of the stack may be locked to a battery base 121B of the charging station 105. The battery base 121B may electrically couple the stack of batteries 120B to other components of the charging station 105 and of the charging hub 104, such as to provide a connection to a power source 162 and building 164. Each charging station 105 may also include a station controller 158, which may be similar to the vehicle controller 118, and may thus be configured, upon execution of software of the station controller 158 by a processor of the station controller 158, to implement the functions, features, and processes of the station controller 158 and charging station 105 described herein. Rather than each charging station 105 including its own station controller 158, the charging hub 104 may include a controller coupled to each charging station 105. Each charging station 105, such as via the charging hub 104, may communicate with the server 106 over the network 110.

Each charging station 105 may further include one or more wireless transceivers 160 configured to communicate with the proximity sensors 154 of the vehicle 102 when the vehicle 102 is local to (e.g., within direct wireless communication range of) the wireless transceivers 160, such as when the vehicle 102 is performing a propulsion towards the charging station 105 to dock the charging station 105. In particular, while the vehicle 102 is performing the propulsion towards the charging station 105 to dock the charging station 105, the station controller 158 for the charging station 105 may transmit homing beacon signals to the vehicle 102 via the wireless transceivers 160. The proximity sensors 154 of the vehicle 102, which may include wireless transceivers corresponding to the wireless transceivers 160, may receive the homing beacon signals, and may generate corresponding proximity data enabling the vehicle controller 118 to determine, based on the received homing beacon signals, whether the vehicle 102 is in alignment to dock the charging station 105.

For example, the wireless transceivers 160 of the charging station 105 and the receiving wireless transceivers of the proximity sensors 154 may be positioned at predetermined locations, and the vehicle controller 118 may be configured to determine whether the vehicle 102 is in alignment to dock with the charging station 105 based on the properties of the homing beacon signals received from the wireless transceivers 160. For instance, each of the receiving wireless transceivers of the proximity sensors 154 may be configured to indicate the strength and reception angle of the homing beacon signals received from the wireless transceivers 160 of the charging station 105, which may then be utilized by the vehicle controller 118 to determine a distance and an angle of each wireless transceiver 160 relative to the proximity sensors 154. Then, knowing the location of the wireless transceivers 160 and/or the receiving proximity sensors 154, the vehicle controller 118 may determine whether alignment adjustments are needed. The vehicle controller 118 may indicate any such needed alignment adjustments to the driver of vehicle 102, such as via the display 157 or the HMI 152, or, in autonomous embodiments, may be configured to control the steering system 140 and/or the active suspension system 142 of the vehicle 102 to provide any needed alignment adjustments.

In some embodiments, the charging stations 105 may be fixed. In other words, the charging station may remain stationary as the vehicle 102 performs a propulsion towards the charging station 105 to dock the battery swapping system 114 with the charging station 105, and then performs a propulsion away from the charging station 105 to disengage the battery swapping system 114 from the charging station 105. In other words, the charging station 105 may rely on the movements of the vehicle 102 to dock the battery swapping system 114 with the charging station 105, and may not make any adjustments to promote the docking.

In alternative embodiments, each charging station 105 may be capable of some limited movement to assist the vehicle 102 in aligning the battery swapping system 114 with the charging station 105 for docking. For example, the movement of the charging station 105 may be passive, such that the position of the battery base 121B and any batteries 120B locked to the battery base 121B may be biased towards a particular position, such as via springs or a similar mechanism. As the vehicle 102 propels towards the charging station 105 to dock the battery base 121A and any batteries 120A locked thereto of the vehicle 102 to the charging station 105, the force of the propulsion may overcome the biasing to cause the battery base 121B and any batteries 120B to move into alignment with battery base 121A and any batteries 120A.

For instance, during the propulsion of the vehicle 102 towards the charging station 105, the battery swapping system 114 may include one or more male connectors protruding towards the charging station 105, such as on the battery base 121A or, if any batteries 120A are locked thereto, on the outermost battery 120A (e.g., the battery 120A furthest from the battery base 121A and/or closest to the charging station 105 during the propulsion). The charging station 105 may include one or more female connectors for receiving the male connectors during the propulsion, such as in the battery base 121B or, if any batteries 120B are locked thereto, then on the outermost battery 120B. Alternatively, the battery base 121A or the outermost battery 120A of the battery swapping system 114 may include the female connectors, and the battery base 121B or the outermost battery 120B may include the male connectors. Upon their engagement via the propulsion, the female and male connectors may be configured to cause movement of the battery base 121B and any batteries 120B of the charging station 105 under the force of the propulsion so as to align them with the battery base 121A and any batteries 120A of the battery swapping system 114. For instance, the size of each protruding male connector may decrease from the proximate end of the connector to the distal end of the connector, and each female connector may be shaped to correspond with the shape of the male connector. Thus, as each male connector engages a female connector during the propulsion of the vehicle 102, the shape of the connectors and the force of the propulsion may cause the charging station 105 to move into alignment with the battery swapping system 114 as the vehicle 102 further propels towards the first charging station 105.

As a further example, movement of the charging station 105 may be active, such that the position of the battery base 121B and any batteries 120B locked thereto on the charging station 105 may be adjusted if needed through the use of actuators. In particular, each charging station 105 may include proximity sensors that are similar to the proximity sensors 154 of the vehicle 102 and are coupled to the station controller 158, which may be configured, based on proximity data generated by the coupled proximity sensors, to determine the location of the battery base 121A and any batteries 120A locked thereto relative to the battery base 121B and any batteries 120B locked thereto as the vehicle 102 propels towards the charging station 105 to dock with the charging station 105. Responsive to determining the relative location, the station controller 158 may be configured to implement small adjustments to the position of the battery base 121B and any batteries 120B locked thereto to better align the charging station 105 with battery base 121A and any batteries 120A locked thereto for docking.

Such active adjustments may be limited to small movements along an x-axis, y-axis, and z-axis of the charging station 105 that are less than a predetermined distance, such as a foot, where movements along the z-axis may correspond to the charging station 105 moving the battery base 121B any batteries 120B up and down. As previously discussed, when batteries 120B are being held by the charging station 105, the batteries 120B may be positioned in a stacked configuration having a stacking axis (also referred to herein as a longitudinal axis) parallel to the direction of the propulsion of the vehicle 102. If the vehicle 102 is a ground vehicle (e.g., robot, automobile) or a watercraft and travels primarily horizontally, then the x-axis of the charging station 105 may correspond to the direction of the propulsion of the vehicle 102 and the longitudinal axis of the batteries 120B when held by the charging station 105. If the vehicle 102 is a UAV, then the z-axis of the charging station 105 may correspond to the direction of the propulsion of the vehicle 102 and the longitudinal axis of batteries 120B when held by the charging station 105.

Each of the charging stations 105 may be coupled, such as via the charging hub 104, to a sustainable power source 162. For example, the power source 162 may be an electric grid, a solar panel, or some other renewable energy source. Responsive to a swappable battery 120A being unloaded from vehicle 102 onto one of the charging stations 105, and thus becoming a battery 120B held by the charging station 105, the charging station 105 may begin recharging the battery 120B via the power source 162. Such recharging may occur without any further relocation of the battery 120B. Once the battery 120B is fully recharged, another vehicle may perform a propulsion towards the same charging station 105 to dock with the charging station 105 and thereby load the battery 120B onto the vehicle. Such a system for swapping batteries into an out of electrically powered vehicles enables batteries to be recharged and reused without significant expenditure on unique complex mechanical mechanisms or human intervention to unload, load, and recharge batteries. Moreover, by providing multiple charging stations 105 at the charging hub 104, with at least one of the charging stations 105 having capacity to receive a discharged battery 120A from the vehicle 102 and at least one of the charging stations 105 including a charged battery 120B loadable into the vehicle 102, the vehicle 102 is able to obtain additional electric energy for its propulsion system 112 in a matter of minutes without having to wait for previously discharged batteries 120A to charge.

In some embodiments, each charging station 105, such as via the charging hub 104, may also be coupled to a building 164, such as a home or office building. In this way, if power to the building 164 should go out, the charged batteries 120B of the charging stations 105 may provide backup power until primary power to the building 164 is restored.

The server 106 may be configured to communicate with the vehicle 102 and the charging hub 104 over the network 110, such as to provide or update user account data and to provide guidance to the vehicle 102. Similar to the vehicle controller 118, the server 106 may include a processor, memory, and non-volatile storage storing data and software that, upon execution by a processor of the server 106, causes the processor to implement the features, functions and processes of the server 106 described herein. The server 106 may have access to a charging hub database 166 and a user account database 168, which may be located in the non-volatile storage of the server 106 or may be located in an external storage device accessible by the server 106.

The charging hub database 166 may include a record for each of one or more charging hubs 104. The record for each charging hub 104 may include one or more of a location of the charging hub 104, operating hours of the charging hub 104, and the status of each charging station 105 of the charging hub 104, such as the number of batteries 120B currently held by the charging station 105 and the charge level of each battery 120B being held by the charging station 105. Such data may be periodically received and stored by the server 106 from the charging hub 104 over the network 110. Thus, when the vehicle 102 needs additional electrical energy, the vehicle controller 118 may be configured to query the server 106 over the network for the locations of charging hubs 104 near the current location of the vehicle 102, such as based on the geographic data of the vehicle 102, that has at least one charged battery 120B available to the vehicle 102. Responsive to receiving the query, the server 106 may be configured to query the charging hub database 166 for charging hubs 104 meeting these criteria. The server 106 may also be configured to determine which of the charging stations 105 is available for the vehicle 102 to unload one or more swappable batteries 120A, and which of the charging stations 105 is available for the vehicle 102 to load charged batteries 120B. Alternatively, this determination may be made by the vehicle 102 or the server 106 when the vehicle 102 reaches the charging hub 104.

The server 106 may be configured to transmit the determined data to the vehicle controller 118 over the network 110, which may responsibly cause the display 157 to illustrate one or more of the determined charging hubs 104 for selection as a destination by a driver, or may cause the vehicle 102 to autonomously travel to the charging hub 104. Responsive to the vehicle 102 coming within a predetermined distance of the charging hub 104, the vehicle controller 118 may cause the display 157 to illustrate which charging stations 105 of the charging hub 104 are available for unloading, and which charging stations 105 of the charging hub 104 are available for loading, as determined by the server 106 based on the charging hub database 166. Alternatively, the vehicle controller 118 may autonomously control the vehicle 102 to unload and load batteries from the charging stations 105 based on the server 106 determinations.

In some embodiments, rather than receiving data indicating available charging stations 105 from the server 106, the vehicle 102, or more particularly the vehicle controller 118, may receive such data directly from the charging stations 105 via the wireless transceivers 160 and the proximity sensors 154. Additionally, or alternatively, each charging station 105 may include one or more visual indicators viewable from the vehicle 102 that indicate whether the charging station 105 is ready to accept one or more swappable batteries 120A from the vehicle 102, and whether the charging station 105 is ready to load one or more charged battery 120B onto the vehicle 102. The driver of the vehicle 102, or the vehicle controller 118 based on proximity data generated by the proximity sensors 154, may then unload and load batteries at the charging stations 105 based on the visual indicators.

The user account database 168 may include, for each of one or more vehicles or one or more drivers, a record indicating information relating to battery transactions previously performed by the vehicle or driver. For instance, if a vehicle or driver unloaded a battery 120A onto a charging station 105, the record for the vehicle driver may be adjusted to indicate a credit for the vehicle or driver depending on the state of the unloaded battery. Additionally, if a vehicle or driver loads a battery 120B from a charging station 105, the record for the vehicle or driver may be adjusted to include a debit for the battery 120B. Periodically, an invoice may be sent to an address on file for the vehicle or driver based on the data included in the user account database 168.

While an exemplary system 100 is shown in FIG. 1, the example is not intended to be limiting. Indeed, the system 100 may have more or fewer components, and alternative components and/or implementations may be used. For instance, two or more of the illustrated vehicle 102 components may be combined such that one of the illustrated vehicle 102 components is configured to implement as least some or all of the described features, functions, and processes of one or more other illustrated vehicle 102 components. As an additional example, the vehicle 102 may include an additional component that includes a controller similar to the vehicle controller 118 and is configured to perform one or more functions described as being performed by a given vehicle 102 component. For example, the described functions, features, and processes of the vehicle controller 118 may be divided among two or more controllers of the vehicle 102 similar to the vehicle controller 118 (e.g., each including a processor, memory, and non-volatile storage including data and executable software).

Figure 2:
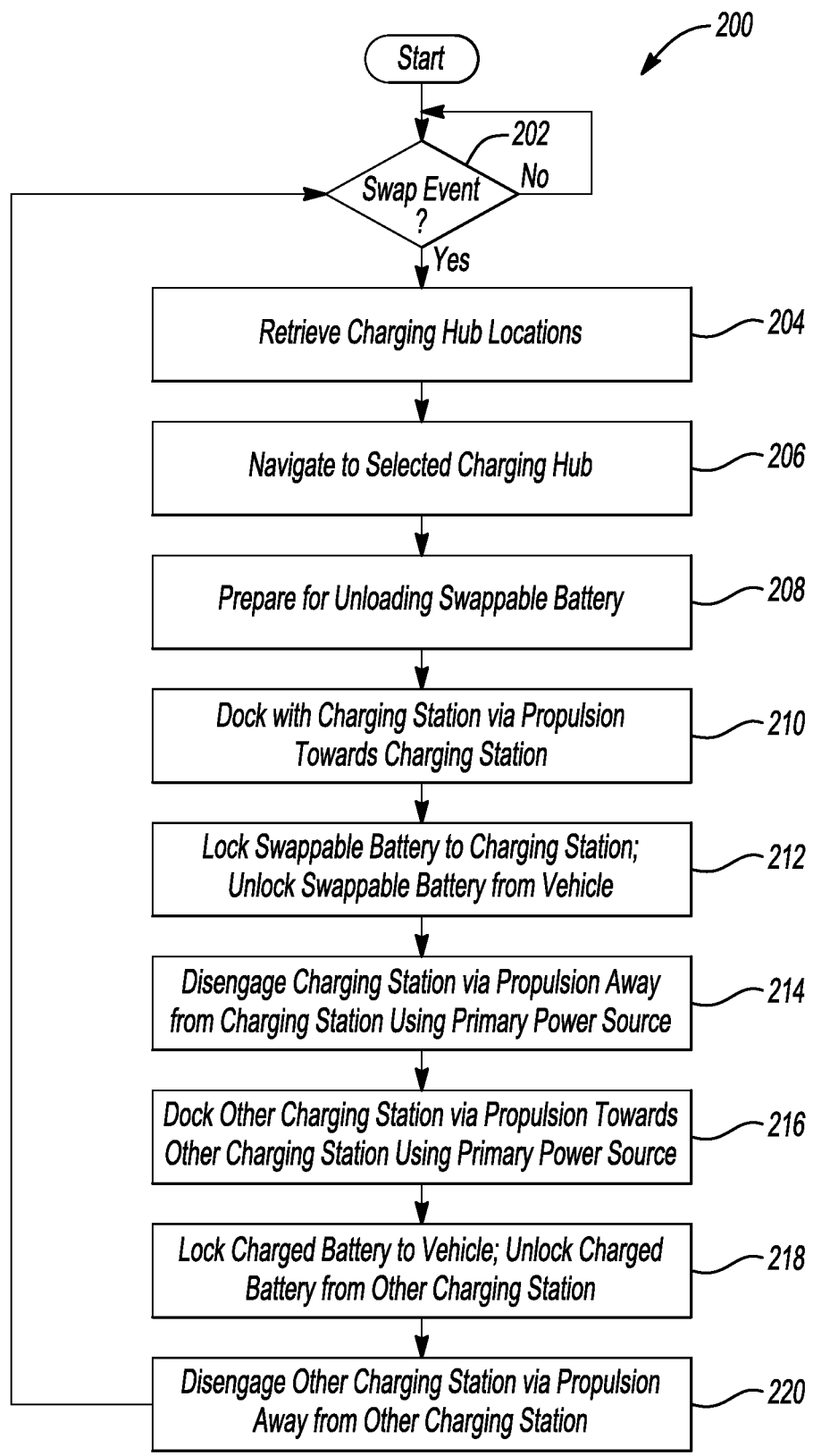
FIG. 2 is a flowchart of an exemplary process that may be performed by the system of FIG. 1 to swap batteries of an electrically powered vehicle.

FIG. 2 illustrates a process 200 that may be performed by the system 100, or more particularly by the vehicle 102 of the system 100, to unload one or more depleted swappable batteries 120A from the vehicle 102 onto a charging station 105A of a charging hub 104, and to load one or more charged swappable batteries 120B onto the vehicle 102 from a charging station 105B of the charging hub 104, via propulsions towards and then away from the charging stations 105.

In block 202, a determination may be made of whether a battery swap event has occurred. In particular, the vehicle controller 118 may be configured to monitor the status of each swappable battery 120A and/or the energy needs of the vehicle 102 to determine whether a battery swap event has occurred. For example, if the charge of the swappable batteries 120A falls below a preset level, the vehicle controller 118 may be configured to determine that a battery swap event has occurred. As a further example, if the vehicle 102 receives a set destination, such as from a driver or via the server 106, the vehicle controller 118 may be configured to determine whether the vehicle 102, based on the current charge level of the swappable batteries 120A, will be able to travel to the destination and thereafter to an available charging hub 104 without running out of power. If not, then the vehicle controller 118 may be configured to determine that a swap event has occurred. As another example, a user of the vehicle 102 may submit a request for a battery swap via the display 157, the HMI 152, or the server 106. Responsive to a user making such request, the vehicle controller 118 may be configured to determine that a battery swap event has occurred.

Responsive to identification of a battery swap event ("yes" branch of block 202) in block 204, the locations of charging hubs 104 within a predetermined distance of the vehicle 102 may be determined. Specifically, the vehicle controller 118 may be configured to transmit a hub location request including the geographic data generated by the GPS module 148 of the vehicle 102 to the remote server 106. The hub location request may also include information detailing the current energy needs of the vehicle 102, such as the amount of power remaining in the swappable batteries 120A, and/or the amount of power that may be needed by the vehicle 102 to reach a set destination and thereafter a charging hub 104, and/or the number of depleted swappable batteries 120A that need to be unloaded from the vehicle 102.

Responsive to receiving the hub location request, the server 106 may be configured to query the charging hub database 166 based on the information included in the request to determine charging hubs 104 that are within a predetermined distance of the current location of the vehicle 102, and that meet the current needs of the vehicle 102. For example, each charging hub 104 determined by the server 106 in response to the hub location request may include at least one charging station 105 (e.g., charging station 105A) having enough available capacity to receive the one or more swappable batteries 120A needing to be unloaded from the vehicle 102, and may include at least one charging station 105 (e.g., charging station 105B) having enough charged batteries 120B to satisfy the needs of the vehicle 102. The server 106 may then be configured to transmit the location of each determined charging hub 104 to the vehicle 102.

In block 206, responsive to receiving the determined charging hub 104 locations, the vehicle 102 may be navigated to one of the determined charging hubs 104. For example, the vehicle controller 118 may be configured to automatically select one of the determined charging hubs 104 based on one or more predetermined factors, such as the determined charging hub 104 closest to the current location of the vehicle 102, and to autonomously operate the vehicle 102 to the selected charging hub 104. Alternatively, the determined charging hubs 104 may be presented to a user of the vehicle 102, such as on the display 157 or on a remote computing device. Responsive to the user selecting one of the displayed charging hubs 104, such as via the display 157 or the HMI 152, the vehicle controller 118 may autonomously operate the vehicle 102 to the selected charging hub 104, or the infotainment system 150 may provide navigation guidance on the of the display 157 that a driver may follow while operating the vehicle 102 to arrive at the selected charging hub 104.

In block 208, responsive to the vehicle 102 coming within a predetermined distance of the charging hub 104, the vehicle 102 may prepare for one or more swappable batteries 120A to be unloaded, and/or for one or more charged batteries 120B to be loaded. In particular, the vehicle controller 118 may be configured to determine when the vehicle 102 comes into the predetermined distance of the selected charging hub 104 based on the geographic data generated by the GPS module 148, and/or based on proximity data generated by the proximity sensors 154 indicating that the charging hub 104 is within the predetermined distance of the vehicle 102. Responsive to the vehicle 102 coming within the predetermined distance of the charging hub 104, the vehicle controller 118 may be configured to prepare the vehicle 102 to unload one or more of the swappable batteries 120A from the battery swapping system 114 onto the charging station 105A, and/or to load one or more of charged batteries 120B from the charging station 105B onto the battery swapping system 114.

In particular, when the vehicle 102 arrives within the predetermined distance of the charging hub 104, the swappable batteries 120A may not be readily available to be unloaded onto the charging station 105A of the charging hub 104, and the battery swapping system 114 may not be in a condition to load one or more charged batteries 120B from the charging station 105B. For example, a protective structure may exist between the swappable batteries 120A and each charging station 105 that needs to be removed before the swappable batteries 120A may be unloaded and the charged batteries 120B may be loaded via a propulsion of the vehicle 102 towards the charging stations 105. For instance, the protective structure may be a liftgate, door, or a detachable structure. Thus, prior to the vehicle 102 unloading one or more swappable batteries 120A and/or loading one or more charged batteries 120B, the vehicle controller 118 may be configured to move or enable moving the protective structure from between the swappable batteries 120A and the charging stations 105. For instance, if the protective structure is a liftgate or door, the vehicle controller 118 may transmit a command signal to the access system 144 that causes the access system 144 to open the liftgate or door.

Alternatively, if the protective structure is a detachable structure, the vehicle controller 118 or a driver of the vehicle 102 may propel the vehicle 102 towards a preparation station of the charging hub 104 that is configured to grab the structure responsive to the propulsion and is also configured, responsive to a subsequent propulsion of the vehicle 102 away from the preparation station, to continue holding the protective structure such that it is removed from the vehicle 102 as the vehicle 102 propels away from the preparation station. In some embodiments, the vehicle controller 118 may be configured to transmit one or more signals to the protective structure responsive to the vehicle 102 propulsion towards the preparation station engaging the protective structure with the preparation station that unlocks the protective structure from the vehicle 102 and/or locks the protective structure to the preparation station. Alternatively, such signals may be transmitted to the protective structure from a controller of the preparation station.

As a further example of block 208, the battery swapping system 114 may include guides extending from a regular storage position of the swappable batteries 120A within the vehicle 102 to an end of the vehicle 102 so that a propulsion of the vehicle 102 may dock the swappable batteries 120A with one of the charging stations 105. For instance, during operation of the vehicle 102 in which the vehicle 102 is not propelling to swap batteries 120, the swappable batteries 120A may be located in or near a center portion of the vehicle 102 so as to help balance weight in vehicle 102. However, in order for a propulsion of the vehicle 102 to dock the swappable batteries 120A with one of the charging stations 105, the swappable batteries 120A may need to be moved to an end of the vehicle 102, such as a top end, bottom end, back end, front end, or side end. Accordingly, prior to one or more of the swappable batteries 120A being unloaded from the vehicle 102, the vehicle controller 118 may be configured to cause the swappable batteries 120A slide along the guides of the vehicle 102 to an end of the vehicle 102 engageable by a charging station 105 upon a propulsion of the vehicle 102.

In block 210, the battery swapping system 114 of the vehicle 102, or more particularly the swappable batteries 120A of the vehicle 102, may be docked with one of the charging stations 105, such as the charging station 105A, via a propulsion of the vehicle 102 towards the charging station 105A. As described above, the vehicle controller 118 or a driver of the vehicle 102 may determine which of the charging stations 105 are available for unloading one or more swappable batteries 120A from the vehicle 102 based on data received from the server 106, data received from the charging hub 104, and/or based on visual indicators adjacent to the charging stations 105. The propulsion of the vehicle 102 that causes the battery swapping system 114 to dock the swappable batteries 120A with the charging station 105A may be performed by a driver of the vehicle 102 receiving guidance via the display 157 and/or HMI 152, or be performed autonomously by the vehicle controller 118, based on the proximity data generated by the proximity sensors 154. In addition to the propulsion of the vehicle 102, the vehicle controller 118 or driver may be configured to utilize the active suspension system 142 of the vehicle 102 to properly align the swappable batteries 120A with the charging station 105.

More particularly, and as illustrated in additional detail below, each of the battery swapping system 114 and the charging stations 105 may be configured to hold one or more batteries 120 in a stacked configuration. The battery swapping system 114 may be configured to hold the batteries 120A in stacked configured such that each battery 120A in the stack is electrically connected to the others and to other components of the vehicle 102, such as the propulsion system 112, the vehicle controller 118, and the infotainment system 150. The charging stations 105 may similarly each be configured to hold the batteries 120B in a stacked configured such that each battery 120B of a charging station 105 is electrically coupled to the other batteries 120B of the charging station 105, and to other components associated with the charging station 105, such as the station controller 158, the wireless transceivers 160, the power source 162, and the building 164.

To this end, each battery 120 may include two stacking faces at opposite ends of the battery 120, such as a front stacking face and a rear stacking face. In a preferred embodiment, the front stacking face and the rear stacking face of the battery 120 are parallel to each other. If the battery 120 has more than one set of parallel faces, then the stacking faces of each battery 120 may be the largest faces of the battery 120. The front stacking face of each battery 120 may be configured to physically and electrically engage the rear stacking face of another battery 120. In addition, the battery swapping system 114 may include a battery base 121A having a mounting face matching the front stacking face of the batteries 120 so as to physically and electrically engage the rear stacking face of each battery 120. Similarly, each charging station 105 may include a battery base 121B having a mounting face matching the rear stacking face of the batteries 120 so as to physically and electrically engage the rear stacking face of each battery 120. The battery base 121A of the battery swapping system 114 may further function to electrically couple the battery 120A engaged therewith, and correspondingly each battery 120A stacked on the battery 120A engaged with the battery base 121A, to the other vehicle 102 components, and the battery base 121B of each charging station 105 may further function to electrically couple the battery 120B engaged therewith, and correspondingly each battery 120B stacked on the battery 120B engaged with the battery base 121B, to the other components associated with the charging station 105, as described above.

In addition to each stacking face of the batteries 120 including a connection for communicating electricity to an adjacent battery 120 or battery base 121, each stacking face may also include a connection for communicating data with an adjacent battery 120 or battery base 121, and may include a connection for communicating coolant with an adjacent battery 120 or battery base 121, the latter connection being used if the the vehicle 102 is an automobile. In other words, each pair of adjacent batteries 120 in a stack of batteries 120 may include a joint for communicating data between the adjacent batteries 120, and may include a joint for communicating coolant between the adjacent batteries 120. In these cases, the battery bases 121 may each include a connection enabling the controllers 118, 158 to form a wired connection and communicate data with each of batteries 120 in a stack. One or more of the battery bases 121, such as the battery base 121A of the vehicle 102, may also include a connection for supplying coolant to the stack of batteries 120. Alternative to a wired communication network being formed between the controllers 118, 158 and each battery 120 in a stack, each battery 120 may include a wireless transceiver configured to receive local wireless communications from the controllers 118, 158 when the controllers 118, 158 are in local communication range of the batteries 120, such as when the vehicle 102 is docked with the charging stations 105.

Each battery 120 may also include a mechanism for locking another battery 120 or one of the battery bases 121 to the battery 120. Similarly, the other of the battery bases 121 may include a mechanism for locking a battery 120 to the battery base 121. Such locking may be performed mechanically, magnetically, and/or electromagnetically. As an example, one of the front and rear stacking faces of each battery 120 may include one or more male connectors protruding outward, and the other of the front and rear stacking faces of each battery 120 may define one or more female connectors corresponding to and configured to receive the protruding male connectors of another battery 120.

Responsive to the protruding male connectors of one battery 120 being inserted into the corresponding female connectors of another battery 120, which may occur upon the battery swapping system 114 docking the batteries 120A with the batteries 120B of a charging station 105 via a propulsion of the vehicle 102 towards the charging station 105, either the battery 120 with the protruding male connectors or the battery 120 defining the female connectors may be configured to lock the other battery 120 thereto. Similarly, responsive to the protruding male connectors of one of the battery bases 121 being inserted into the female connectors defined by one of batteries 120, either the battery base 121 including the protruding male connectors or the battery 120 defining the female connectors may be configured to lock the other thereto, and responsive to the protruding male connectors of one of the batteries 120 being inserted into the female connectors defined by the other one of the battery bases 121, either the other one of the battery bases 121 defining the female connectors or the battery 120 including the protruding male connectors may be configured to lock the other thereto. The locking and unlocking action between two adjacent batteries 120 and between a battery 120 and one of the battery bases 121 may be done in response to a signal from one of the controllers 118, 158. In some embodiments, the locked state be maintained by default such as using a mechanical spring, and an external power may be required to achieve the unlocked state to ensure a fail-safe locking system.

For instance, each of the protruding connectors may include a slot for receiving a locking pin from one of the apertures when the protruding connectors are fully engaged with apertures, which may be mechanically extended into and out of the aperture and slot by the battery 120 defining the apertures, such as at the direction of one of the controllers 118, 158. Alternatively, each of the apertures may include a slot for receiving a locking pin from one of the protruding connectors when the protruding connectors are fully engaged within apertures. Similarly, the locking pin may be mechanically extended into and out of the slot of the apertures from the protruding connectors by the battery 120 including the protruding connectors, such as at the direction of one of the controllers 118, 158. As a further example, each battery 120 may be configured to engage an electromagnetic force that holds the battery 120 to another battery 120 or one of the battery bases 121, and the other of the battery bases 121 may similarly be configured to engage an electromagnetic force holds a battery 120 to the other of the battery bases 121. In addition to performing the locking functions described above, the protruding connectors and the apertures may each include the connections for communicating electricity, data, and coolant between the batteries 120, and between the batteries 120 and the battery bases 121.

As discussed above, in some embodiments, the position of the charging stations 105, and the position of the batteries 120B and the battery bases 121B thereof, may be fixed, such that alignment of the battery swapping system 114 and the swappable batteries 120A with the charging station 105 is performed via the vehicle 102 alone. Alternatively, the charging station 105 may also be configured to make slight passive adjustments under the force of the propulsion of the vehicle 102, and/or make slight active adjustments under the force of actuators of the charging station 105 to assist in the docking.

As an example of passive adjustments, in the above example in which one stacking face of each of the batteries 120 and one of the battery bases 121 includes protruding male connectors, and the other stacking surface of each of the batteries 120 and the other of the battery bases 121 defines corresponding female connectors, the width of each protruding male connector may decrease from its proximate end to its distal end, and the width of each female connector may decrease from the opening of the female connector to further into the battery 120 and battery base 121. Thus, as the vehicle 102 is propelled towards a charging station 105, the relatively smaller distal ends of the protruding male connectors may be inserted into the relatively wider openings of defined female connectors, but not necessarily be centered within the openings. Thereafter, as the vehicle 102 is further propelled towards the charging station 105, the force of the propulsion may cause the position of the batteries 120B and battery base 121B to be passively adjusted so as to enable the protruding male connectors and the corresponding female connectors to reach full engagement such that the protruding male connectors are centered within and fully inserted in the corresponding female connectors.

The battery swapping system 114 may be configured to dock with a charging station 105 via a propulsion of the vehicle 102 towards the charging station 105 that is in a direction parallel to the longitudinal axis of a stack of batteries 120A when carried by the vehicle 102, and to the longitudinal axis of a stack of batteries 120B when held by the charging station 105. The longitudinal axis may be the axis along which batteries 120 is stacked.

The battery swapping system 114 may be considered docked with the charging station 105 when the outermost battery 120A of a stack of the batteries 120A carried by the battery swapping system 114 (e.g., battery 120A furthest from the battery base 121A and/or closest to the charging station 105 during the propulsion), or if no batteries 120A are present in the vehicle 102, then when the battery base 121A of the battery swapping system 114, is fully engaged with the outermost battery 120B of a stack of batteries 120B held by the charging station 105 (e.g., battery 120B furthest from the battery base 121B and/or closest to the vehicle 102 during the propulsion), or if none are present on the charging station 105, with the battery base 121B of the charging station 105. For example, in the case of protruding male connectors and corresponding female connectors discussed above, once the protruding male connectors of one of the outermost batteries 120 are fully inserted into the defined female connectors of the other of the outermost batteries 120, the battery swapping system 114, or more particularly the swappable batteries 120A, may be considered as being docked with the charging station 105, or more particularly the batteries 120B.

In block 212, subsequent to the battery swapping system 114 being docked with the charging station 105A, and in response to one or more signals received from the controllers 118, 158, one or more swappable batteries 120A may be locked to the charging station 105A, and unlocked from the battery swapping system 114, preferably in that order. Specifically, when the battery swapping system 114 is docked with the charging station 105A, each of the swappable batteries 120A, the battery base 121A, the swappable batteries 120B of the charging station 105A, and the battery base 121B of the charging station 105B may be coupled to the vehicle controller 118 for data communication therebetween, and may be coupled to the station controller 158 for data communication therebetween, such as via a wired data communication network formed by data communication joints between each pair of adjacent batteries 120, and between the batteries 120 and the battery bases 121, as described above. Thus, either the vehicle controller 118 or the station controller 158 may be configured to transmit one or more command signals to the swappable batteries 120A and/or battery bases 121 that cause one or two or more batteries 120A to lock to the charging station 105A and unlock from the battery swapping system 114.

Specifically, after the battery swapping system 114 is docked with the charging station 105A, the battery swapping system 114 may be configured to unload the outermost battery 120A or two or more of the outermost batteries 120A from the battery swapping system 114, where the outermost batteries 120A are the batteries 120A furthest from the battery base 121A and/or closest to the charging station 105A. To this end, a command signal may be transmitted to one of the outermost battery 120A carried by the battery swapping system 114 and the outermost battery 120B of the charging station 105A (or the battery base 121B if no batteries 120B are currently present on the charging station 105A) to cause the battery 120 (or the battery base 121B) receiving the command signal to lock to the other. In other words, the command signal may be transmitted to the outermost battery 120A, and thereby cause the outermost battery 120A to lock itself to the outermost battery 120B, or the battery base 121B if no batteries 120B are present on the charging station 105A. Alternatively, the command signal may be transmitted to the outermost battery 120B, or the battery base 121B if no batteries 120B are present on the charging station 105A, and thereby cause the outermost battery 120B or the battery base 121B to lock itself with the outermost battery 120A. Similarly, another command signal may be transmitted to one of the innermost battery 120A (e.g., battery 120A closest to the battery base 121A and/or furthest from the charging station 105) in the outermost batteries 120A being unloaded and the battery 120A immediately adjacent to this innermost battery 120A that is not being unloaded (or the battery base 121A if the innermost battery 120A being unloaded is immediately adjacent to the battery base 121A within the stack) to cause the battery 120A (or the battery base 121A) receiving the command signal to unlock from the other. Rather than utilizing a wired data communication network to communicate these command signals, each battery 120 may include a wireless transceiver for receiving such command signals from station controller 158 or the vehicle controller 118.

In block 214, the battery swapping system 114 may disengage the charging station 105A via a propulsion of the vehicle 102 away from the charging station 105A using the primary power source 116 to power the propulsion system 112. In particular, because one or more or all the swappable batteries 120A may now be locked to the charging station 105A, a driver of the vehicle 102, or the vehicle controller 118 controlling the vehicle 102 autonomously, may cause the vehicle 102 to perform a propulsion away from the charging station 105 using the primary power source 116 to unload the unlocked swappable batteries 120A. The direction of the propulsion away from the charging station 105A may be opposite the direction of the propulsion towards the charging station 105A, and may similarly be parallel to the longitudinal axis of a stack of batteries 120 when carried by the battery swapping system 114 and the charging station 105A.

In block 216, the battery swapping system 114 may then dock with another charging station 105, such as the charging station 105B, to load one or more charged batteries 120B via a propulsion of the vehicle 102 towards the charging station 105B using the primary power source 116. As described above, the identification of the charging station 105B having one or more available charged batteries 120B may be based on data received from the charging hub 104, the server 106, and/or visual indicators adjacent to each charging station 105. Docking the battery swapping system 114 with charging station 105B may occur similarly to the docking of the charging station 105A described above. Specifically, a driver may control the vehicle 102 to perform a propulsion towards the charging station 105B based on guidance generated by the vehicle controller 118 and provided via the display 157 and/or HMI 152. Alternatively, the vehicle controller 118 may be configured to autonomously dock the battery swapping system 114 with charging station 105B by causing a propulsion of the vehicle 102 towards the charging station 105B based on proximity data generated by the proximity sensors 154.

In block 218, subsequent to the battery swapping system 114 being docked with the charging station 105B via the propulsion of the vehicle 102 towards the charging station 105B, one or more of the charged batteries 120B being held by the charging station 105B may be locked to the battery swapping system 114, and unlocked from the charging station 105B, preferably in that order. Similar to block 212, either the vehicle controller 118 or the station controller 158 of the charging station 105 may transmit one or more command signals to one or more of the batteries 120B, the batteries 120A of the vehicle 102 if present, the battery base 121A, and the battery base 121B that cause one or more of the charged batteries 120B to be locked to the battery swapping system 114 and unlocked from the charging station 105B.

Thereafter, in block 220, the battery swapping system 114 may be disengaged from the charging station 105B via a propulsion of the vehicle 102 away from the charging station 105B. Specifically, once the charged batteries 120B are locked to the battery swapping system 114, the charged batteries 120B may be electrically coupled to the propulsion system 112 of the vehicle 102 via the battery base 121A. Accordingly, a vehicle 102, such as at the direction of a guided driver or autonomously via the vehicle controller 118, may perform a propulsion away from the charging station 105B that disengages the battery swapping system 114 from the charging station 105B under the power of the now loaded charged batteries 120B, which may now be considered as swappable batteries 120A powering the components of the vehicle 102. If a protective structure previously encased the swappable batteries 120A, or if the swappable batteries 120A and/or battery base 121A were moved along guides for unloading or loading, then the protective structure may be placed back into its protective position, and the swappable batteries 120A and the battery base 121A may be moved back along the guides to their initial position, respectively, such as at the direction of the vehicle controller 118.

Responsive to the charging station 105A receiving the swappable batteries 120A from the battery swapping system 114, the charging station 105A may be configured to charge the swappable batteries 120A from the power source 162, such as via the charging hub 104. In particular, each charging station 105 may be configured to charge swappable batteries 120A unloaded thereon, which may then be considered as batteries 120B held by the charging station 105A, on a last-in-first-to-charge basis. In other words, the outermost battery 120B recently unloaded onto the charging station 105A may be charged first, so that if subsequently another vehicle arrives at the charging hub 104 seeking a charged battery 120B, the another vehicle may load one or more charged batteries 120B from the charging station 105A via a propulsion of the another vehicle towards the charging station 105A, even if one or more of the innermost batteries 120B on the charging station 105A are not yet fully charged.

Figure 3:
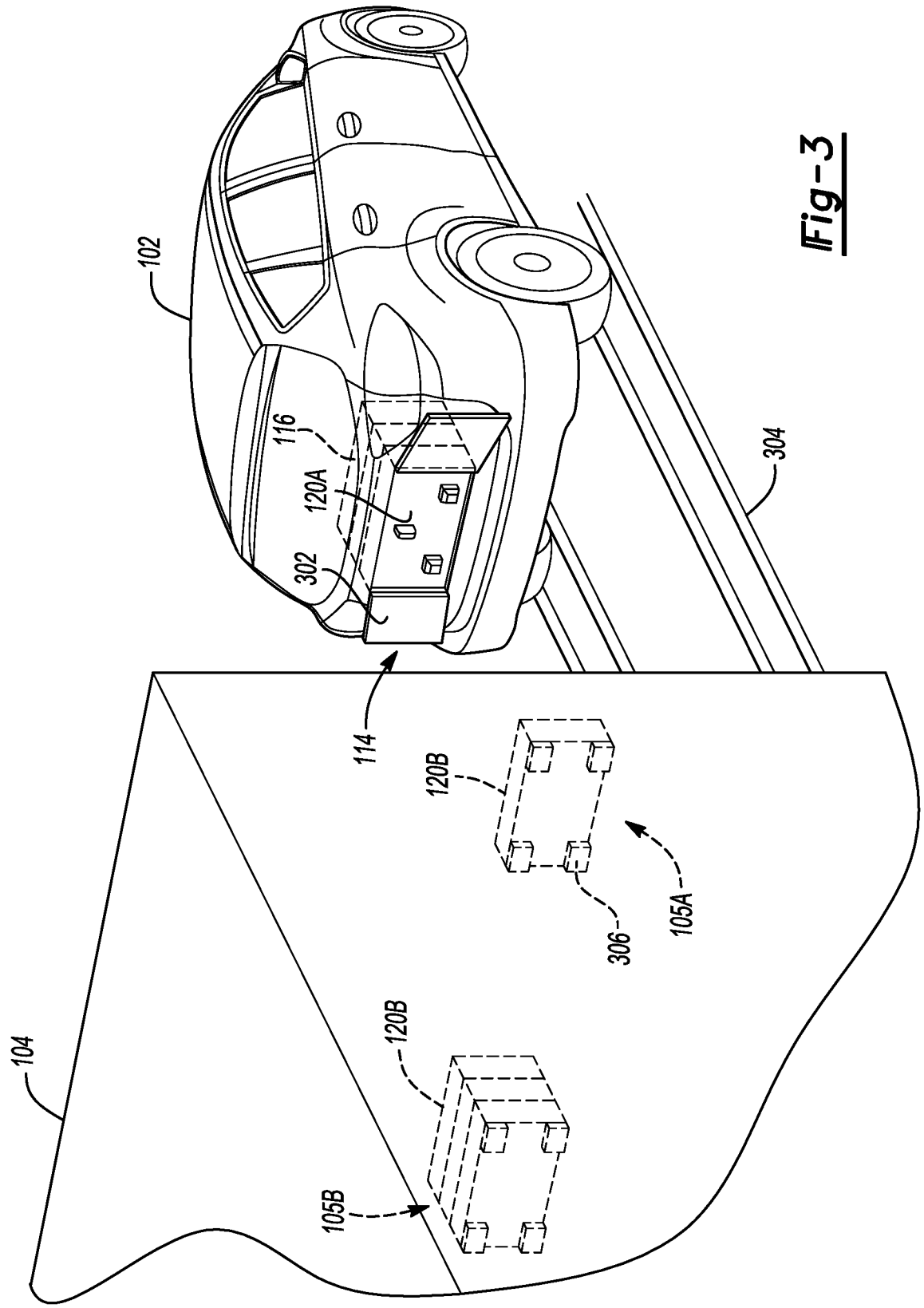
FIG. 3 is a diagram illustrating an exemplary electrically powered automobile swapping one or more batteries with a charging hub.

FIG. 3 illustrates an exemplary embodiment in which a vehicle 102 in the form of an automobile uses a charging hub 104 to swap batteries. As shown in the illustrated embodiment, the swappable batteries 120A of the battery swapping system 114 may be located at the rear end of the automobile behind a sliding battery cover 302 of the battery swapping system 114. The primary power source 116, which may be a battery similar to the swappable batteries 120A, may be part of the battery stack carried by the vehicle 102, such as on a battery base 121A of the battery swapping system 114. Specifically, the primary power source 116 may be located behind the innermost swappable battery 120A of the vehicle 102 within the stack. In other words, the primary power source 116 may be the innermost battery in the stack, such as between the battery base 121A and the swappable batteries 120A.

As described above, a driver of the vehicle 102 or the vehicle controller 118 may utilize GPS navigation provided by the GPS module 148 and the infotainment system 150 to locate and arrive at the vicinity of the charging hub 104. The vehicle controller 118 may then receive data from the server 106 or from the charging stations 105 of the charging hub 104 that indicates which charging station 105 has one or more charged batteries 120B for the vehicle 102, and/or which charging station 105 has capacity to receive one or more batteries 120A from the vehicle 102. The vehicle 102 may then proceed to one of the charging stations 105 having capacity, such as charging station 105A, to unload one or more swappable batteries 120A to the charging station 105A. The vehicle controller 118 may then utilize proximity data generated by the proximity sensors 154, and may utilize one or more signals transmitted from the wireless transceivers 160 of the charging station 105A, to triangulate its position relative to the charging station 105A so that the vehicle 102 may be positioned in front of the charging station 105A. For example, the vehicle controller 118 may provide guidance to a driver via the display 157 and/or the HMI 152 that enables a driver to place the vehicle 102 in the proper position, or may autonomously operate the vehicle 102 to the proper position.

In some embodiments, each charging station 105 of the charging hub 104 may include a set of tracks 304 extending out in front of the charging station 105 to further guide the vehicle 102 as it performs a propulsion towards the charging station 105 to dock the battery swapping system 114 with the charging station 105. As described in reference to block 208 of the process 200, responsive to the vehicle 102 coming within a predetermined distance of the charging hub 104, and/or to the vehicle 102 performing the propulsion towards the charging station 105 to dock the battery swapping system 114 with the charging station 105, the vehicle controller 118 may be configured to open the sliding battery cover 302, thereby making the battery swapping system 114 accessible for docking with the charging station 105.

As the vehicle 102 approaches the charging station 105A, the vehicle controller 118 may ensure accurate alignment with the charging station 105A by operating the vehicle 102 or providing guidance to a driver based on the proximity data generated by the proximity sensors 154. In addition to the backward/forward and steering motions, the vehicle controller 118 or driver may also utilize the vehicle's 102 active suspension system 142 to raise or lower the vehicle's 102 back end to position correctly with the charging station 105A. In addition, the connectors on the batteries 120 may also provide alignment functions.

The propulsion towards the charging station 105 to dock the battery swapping system 114 with the charging station 105A may be powered by swappable batteries 120A of the vehicle 102 providing electrical energy to one or more electric motors of the propulsion system 112 of the vehicle 102. With electric motor based propulsion, the vehicle 102 is capable of precise movements to ensure smooth docking. However, if needed, each of the charging stations 105 may include systems such as the dampers or shock absorbers 306 to absorb the force of the docking and prevent damage to the batteries 120, the charging station 105, and the vehicle 102. Responsive to the outermost swappable battery 120A of the battery swapping system 114 docking the charging station 105A, or more particularly the outermost battery 120B of the charging station 105A (or the battery base 121B if no batteries 120B are present on the charging station 105A), via the propulsion of the vehicle 102 towards the charging station 105A, at least one command signal may be sent from the vehicle 102, from the charging station 105, or a centralized system, such as the remote server 106, to lock one or more of the swappable batteries 120A to the charging station 105A, and to unlock the one or more swappable batteries 120A from the vehicle 102.

The vehicle 102 may then disengage from the charging station 105A using a propulsion powered by its primary power source 116 away from the charging station 105A. The vehicle 102 may then proceed to charging station 105B in a manner similar to that described above to engage and dock the battery swapping system 114 with the outmost charged battery 120B on the charging station 105B. At least one command signal may then be sent to one or more of the charged batteries 120B to unlock the one or more charged batteries 120B from the charging station 105B and lock the one or more charged batteries 120B to the battery swapping system 114. The vehicle 102 may then move forward away from the charging station 105B with the newly received one or more charged batteries 120B.

As further shown in the illustrated embodiment, the batteries 120B of each charging station 105, and each charging station 105, may be mounted on a wall such as a garage wall in a home or a parking structure. In such cases, the batteries 120B on the charging stations 105 may be charged using solar or other renewable energy sources (e.g., power source 162), and may provide backup power to a home or business (e.g., building 164) or provide energy back to the electric grid during peak hours. When multiple batteries 120B are stacked on a given charging station 105, the outermost batteries 120B may be charged first and the innermost batteries 120B may be drained first to provide backup power.

Figure 4:
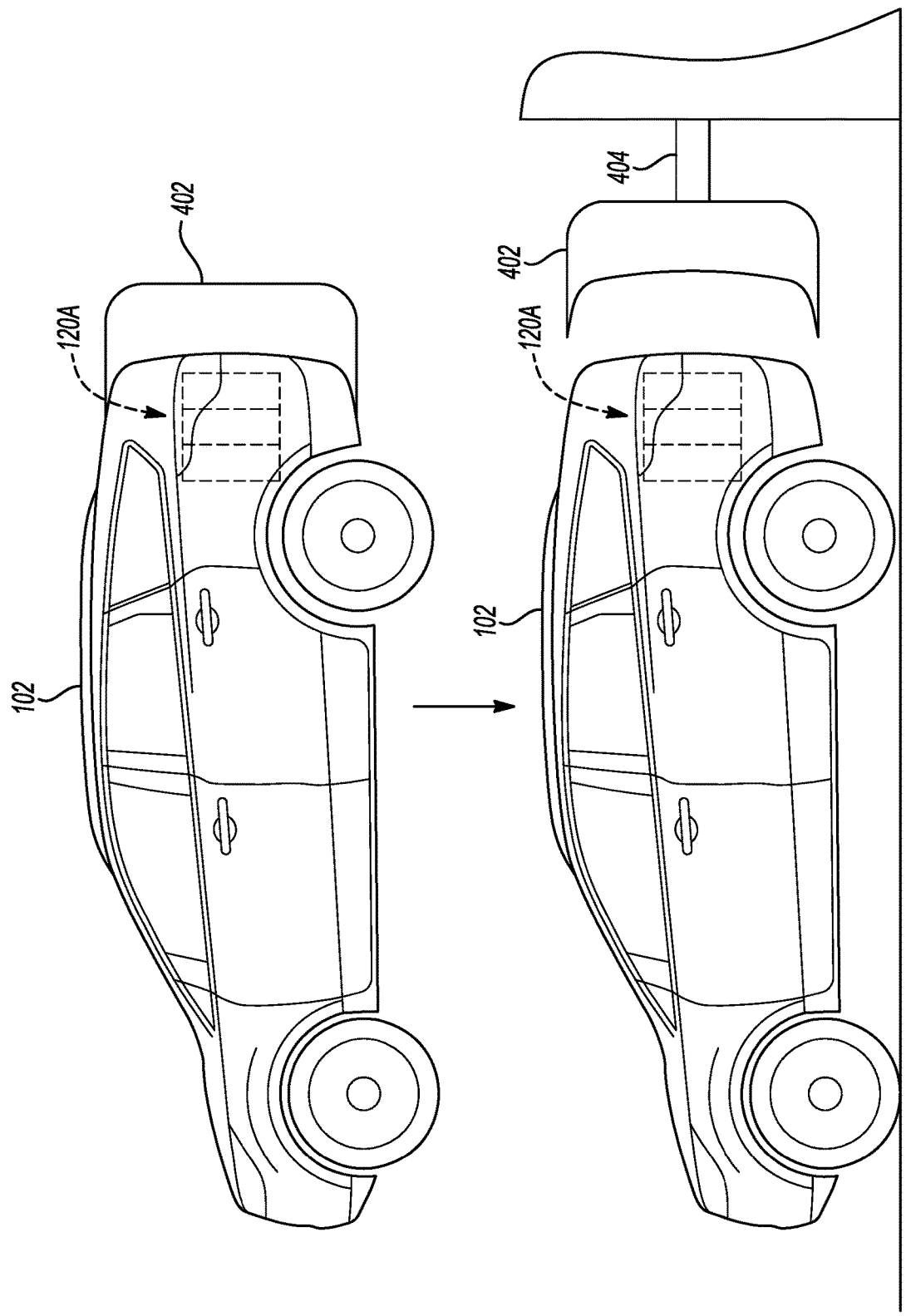
FIG. 4 is a diagram illustrating an exemplary electrically powered automobile including an exemplary removable protective structure.

FIG. 4 illustrates an exemplary embodiment in which the vehicle 102 is an automobile having a protective cover 402 for the swappable batteries 120A that is removable from the vehicle 102. Specifically, as described above in reference to block 208 of the process 200, responsive to the vehicle 102 coming within a predetermined distance of a selected charging hub 104, the vehicle 102 may be prepared for unloading one or more swappable batteries 120A from the vehicle 102, and loading one or more charged batteries 120B onto the vehicle 102. To this end, the vehicle 102 may perform a propulsion towards a preparation station 404 such that the protective cover 402 is engaged with the preparation station 404. As an example, such a propulsion may occur at the direction of a driver while receiving alignment guidance, such as via the display 157 and/or HMI 152, from the vehicle controller 118 based on proximity data generated by the proximity sensors 154. Alternatively, the vehicle controller 118 may be configured to autonomously operate the vehicle 102 to align the protective cover 402, which may also be decorative, with the preparation station 404.

Responsive to the protective cover 402 being docked with the preparation station 404, the preparation station 404 may be configured to grab the protective cover 402 such that, responsive to a subsequent forward propulsion of the vehicle 102 from the preparation station 404, such as via the driver or autonomously via the vehicle controller 118, the protective cover 402 may disengage from the vehicle 102 and remain at the preparation station 404, thereby enabling access to the swappable batteries 120A of the vehicle 102

In some embodiments, the vehicle 102 or the protective cover 402 may include an electrically controlled locking mechanism for securing the protective cover 402 to the vehicle 102, and/or the protective cover 402 or the preparation station 404 may include an electrically controlled locking mechanism for securing the protective cover 402 to the preparation station 404. Responsive to the vehicle 102 performing the propulsion that engages the protective cover 402 with the preparation station 404 via the propulsion of the vehicle 102 towards the preparation station 404, each locking mechanism may receive a signal, such as from the vehicle controller 118 or a controller of the preparation station 404, which may function similarly to the station controller 158, to unlock the protective cover 402 from the vehicle 102, and/or to lock the protective cover 402 to the preparation station 404. In some embodiments, the preparation station 404 may be configured to magnetically retain the protective cover 402 responsive to the vehicle 102 engaging the protective cover 402 with the preparation station 404, to the protective cover 402 being thereafter unlocked from the vehicle 102 via a command signal, and to the vehicle 102 thereafter being propelled away from the preparation station 404.

After the vehicle 102 has swapped batteries 120 with the charging stations 105 of the charging hub 104, the vehicle 102 may again perform a propulsion, such as via a driver or autonomously via the vehicle controller 118, towards the preparation station 404 to engage the vehicle 102 with the protective cover 402. Thereafter, the vehicle 102 or the protective cover 402 may receive a command signal that locks the protective cover 402 to the vehicle 102, and/or the protective cover 402 and/or the preparation station 404 may receive a command signal that unlocks the protective cover 402 from the preparation station 404. In this way, the vehicle 102 may perform a propulsion away from the preparation station 404 while retaining the protective cover 402, and may then proceed on its way. In embodiments where the protective cover 402 is held by the preparation station 404 via a constant magnetic force, the propulsion of the vehicle 102 away from the preparation station 404 when the protective cover 402 is locked to the vehicle 102 may be more than enough to overcome the magnetic force, thereby causing the protective cover 402 to release from the preparation station 404.

Figure 5:
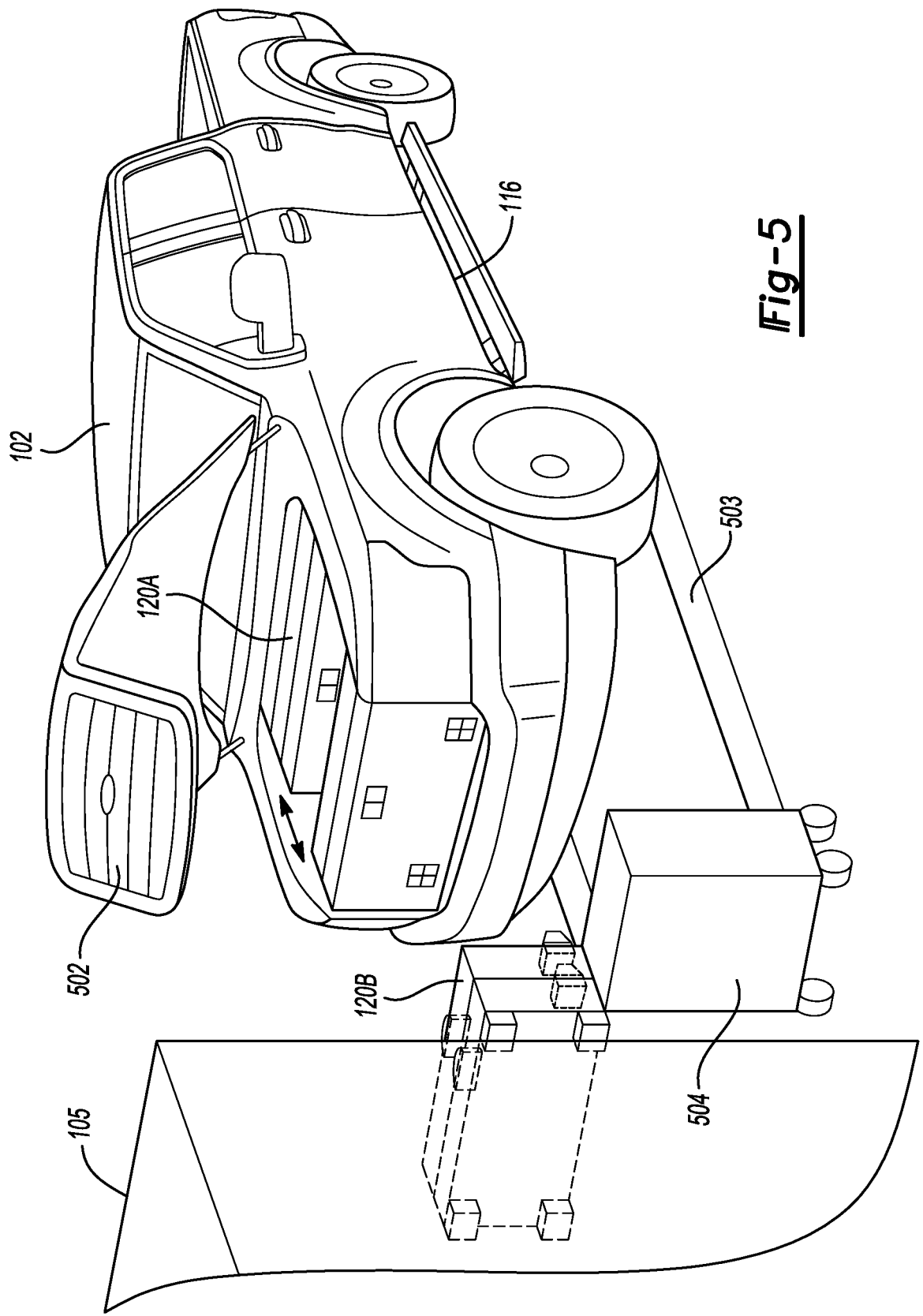
FIG. 5 is a diagram illustrating a further exemplary electrically powered automobile swapping one or more batteries with a charging station.

FIG. 5 illustrates an exemplary embodiment where the vehicle 102 is an automobile in the form of a pickup truck, and the swappable batteries 120A are located in a hood compartment of the automobile under a hood 502 hinged to the vehicle 102. This positioning may be possible due to the available free space under the hood 502 in electric automobiles, but can also be possible for hybrid electric automobiles with a small internal combustion engine also under the hood 502. As shown in the illustrated embodiment, the primary power source 116, which may be a backup battery or capacitor, may be located under a floor of the vehicle 102, and may be downsized from what would be the primary power source 116 if the swappable batteries 120A were not part of the vehicle 102.

The exemplary embodiment of FIG. 5 illustrates examples of several of the blocks of the process 200. For example, as described above in reference to block 208 of the process 200, responsive to the vehicle 102 coming within a predetermined distance of a charging hub 104, the vehicle controller 118 may transmit a control signal to the access system 144 of the vehicle 102 that causes the access system 144 to open the hood 502 of the vehicle 102, thereby enabling access to the swappable batteries 120A included in the hood compartment.

Moreover, the swappable batteries 120A may have a default position during regular operation of the vehicle 102 (i.e., when the vehicle 102 is not in the process of swapping batteries 120), which may be designated by a user so that the user may utilize the space under the hood 502 as desired. For example, the default position may be the back of the hood compartment, which may place the swappable batteries 120A near the center of the vehicle 102 during regular operation of the vehicle 102 so as to help balance the weight of the vehicle 102. Thus, in order to enable unloading the swappable batteries 120A from the battery swapping system 114, and enable loading charged batteries 120B onto the battery swapping system 114, the battery swapping system 114 may include guides extending from the back of the hood compartment to the front of the hood compartment to slide the swappable batteries 120A towards the front of the hood compartment, such as at the direction of the vehicle controller 118.

Thereafter, as discussed above in reference to block 210 of the process 200, the vehicle 102 may be operated to perform a propulsion, such as manually by a driver of the vehicle 102, or autonomously by the vehicle controller 118, each being guided based on proximity data generated by the proximity sensors 154, that docks the swappable batteries 120A with the batteries 120B of a charging station 105. In some embodiments, tracks 503 may extend out from the charging station 105 in a direction parallel with the propulsion of the vehicle 102 to guide the vehicle 102 towards correct alignment with the batteries 120B of the charging station 105.

The batteries 120A used in different vehicles 102 may be standardized, and, as previously described, the charging stations 105 may be configured to change positions of the batteries 120B thereon to accommodate vehicles 102 having different heights and overhangs. Moreover, a vehicle 102 may include an active suspension system 142 that raises or lowers various parts of the vehicle 102 to align the swappable batteries 120A of the vehicle 102 with batteries 120B of a charging station 105 for proper docking. In some alternative embodiments, such as if the motion of the vehicle 102 is not capable of the precision required for docking, the vehicle 102 may propel onto the tracks 503, and responsively, the tracks 503 may be moved by a specially designed carrier 504 configured to move the tracks 503, and correspondingly the vehicle 102, in place so as to have the swappable batteries 120A dock with the batteries 120B or battery base 121B of the charging station.

The battery swapping system 114 may have additional configurations within the vehicle 102. For example, in some embodiments, a swappable battery 120A of the vehicle 102 may be configured to blend with the external styling and features of the vehicle 102. In this case, the swappable battery 120A may have a safety structure integrated thereon to function as part of a rear end or front end of the vehicle 102. As a further example, the battery swapping system 114 may employ safe battery cells such as solid state battery cells for the swappable batteries 120A, which may not need to be contained behind a protective safety structure.

As a further example, such as if the cosmetic or structural performance of the swappable batteries 120A are not acceptable, the swappable batteries 120A may be positioned behind another module to provide the desired cosmetic or structural performance. For instance, similar to the embodiment illustrated in FIG. 5 in which the swappable batteries 120A are located under a hood 502 of the vehicle 102, the swappable batteries 120A may be positioned in a trunk compartment behind a liftgate of the vehicle 102. In block 208 of the process 200, the vehicle controller 118 may cause the vehicle 102 to prepare for loading and/or unloading batteries 120 by opening the liftgate out of the way to enable docking of to the batteries 120A with the charging stations 105. In some embodiments, the vehicle 102 may include swappable batteries 120A on opposite sides of the vehicle 102, such as front and rear for automobiles, or top and bottom for UAVs, to achieve balance in the weight and improve vehicle handling.

In the case where the vehicle 102 includes one or more swappable batteries 120A in the trunk of the vehicle 102, similar to the embodiments illustrated in FIG. 5, the swappable batteries 120A may be located at a default position, which may be customized by a user, during regular operation of the vehicle 102. For instance, the default position may be in the back of the trunk adjacent to the rear seats. The trunk may also include guides extending from the rear seats to the end of the vehicle 102 so as to enable the vehicle controller 118 to slide the swappable batteries 102A to the end of the vehicle 102 when unloading and/or loading of batteries 120 is desired. Thus, in block 208 of the process 200, when the vehicle 102 is being prepared for battery 120 loading and/or unloading, the vehicle controller 118 may be configured to transmit a signal to the access system 144 that causes the access system 144 to open the trunk or liftgate blocking access to the swappable batteries 120 of the vehicle 102. Furthermore, the vehicle controller 118 may cause the swappable batteries 120A to slide along the guides to the end of the vehicle 102 so as to enable docking of the swappable batteries 120A with a charging station 105 via a propulsion of the vehicle 102 towards the charging station 105.

Figure 6:
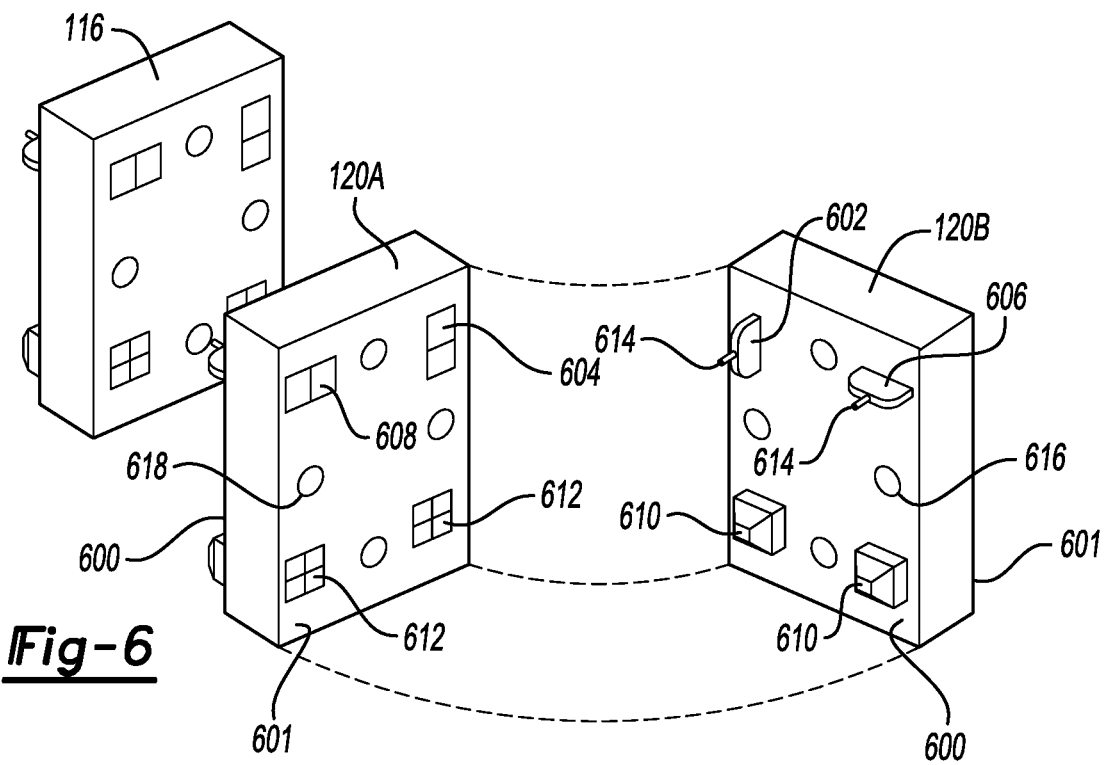
FIG. 6 is a diagram illustrating exemplary connections between batteries.

FIG. 6 illustrates exemplary connectors that may present on each swappable battery 120, and how batteries 120 may be joined in a self-aligning and fail-safe way. As previously described, swappable battery 120A may be located on the vehicle 102, and swappable battery 120B may be located on a charging station 105. As shown in the illustrated embodiment, each battery 120 may include a front stacking face 600 and a rear stacking face 601, with male connectors on one stacking faces 600, 601, and matching female connectors on the other of the stacking faces 600, 601. To protect from dust and dirt, the female connectors may be covered by flops that fold in during joining of the batteries 120. One or more corresponding male and female connectors may provide a locating or aligning function. One or more corresponding male and female connectors may provide an electrical connection. All electrical connectors may be designed to be safe to touch outside. One or more corresponding male and female connectors may provide for implementing a cooling system between the batteries if needed. One or more corresponding male and female connectors may provide data communication between the batteries 120, and with the controllers 118, 158. Alternatively, the data communication connection between the batteries 120 and the controllers 118, 158 may be achieved by wireless transceivers included in each battery 120 and coupled to the controllers 118, 158.

For example, in the specific embodiment illustrated in FIG. 6, the male connectors are provided on the front stacking face 600 of each battery 120, and the female connectors are provided on the rear stacking face 601 of each battery 120. This arrangement may be reversed. The male connector 602 may provide a vertical alignment function when inserted into the female connector 604, and the male connector 606 may provide a horizontal alignment function when inserted into the female connector 608, such as by virtue of the male connectors 602, 606 decreasing in size from proximate end to distal end and the female connectors 604, 608 decreasing in size from the surface of the battery 120A inward to correspond to the decreasing size of the male connectors 602, 606. In addition, male connectors 610 may be configured to join with female connectors 612 to provide electrical connections between the batteries 120.

With the swappable and stackable battery system described herein, there may be less demand for quick charging of batteries 120, and hence less need for cooling the batteries 120 during quick charging. Therefore, an air cooled system may be sufficient for these batteries 120. However, if liquid cooling is required, coolant lines 614 may provide the required cooling system connection between the batteries 120 of a stack. In such cases, the cooling system on the vehicle 102 may provide the coolant for the batteries 120A, which may be communicated from battery 120A to battery 120A via the coolant lines 614, via the battery base 121A. Alternatively, each battery 120 may house its own cooling system.

One or more of the male connectors 602, 606, and 610 may be locked in place within the female connectors 604, 608, and 612, respectively, using fail-safe bolts that retract only when actuated, such as via a command signal sent to one of the batteries 120A, 120B from one of the controllers 118, 158. In addition, or alternatively, connectors 616 and 618 may provide a fail-safe magnetic gripping action when the swappable batteries 102A, 102B are joined. The connectors and joining methods described in this embodiment are for illustration purposes only, and other joining methods between the batteries 120 may be designed within the intent of this invention.

As shown in the embodiment illustrated in FIG. 6, the primary power source 116 may be a battery configured to be stacked with the swappable batteries 120. In other words, the primary power source 116 may similarly include a front stacking face and a rear stacking face, with one of the front and rear stacking faces including male connectors that mirror the male connectors on each battery 120, and the other of the front and rear stacking faces including female connectors that mirror the female connectors on each battery 120. Similarly, one of the battery base 121A and the battery base 121B may include male connectors mirroring the male connectors of each battery 120, and the other of the battery base 121A and battery base 121B may include female connectors mirroring the female connectors on each battery 120. Such a configuration may enable one or more batteries 120A to be stacked onto the battery base 121A via the male and female connectors, one or more batteries 120B to be stacked onto the battery base 121B via the male and female connectors, and the one or more stacked batteries 120A to be docked with and stacked on the one or more stacked batteries 120B via a propulsion of the vehicle 102 towards the charging station 105.

Figure 7:
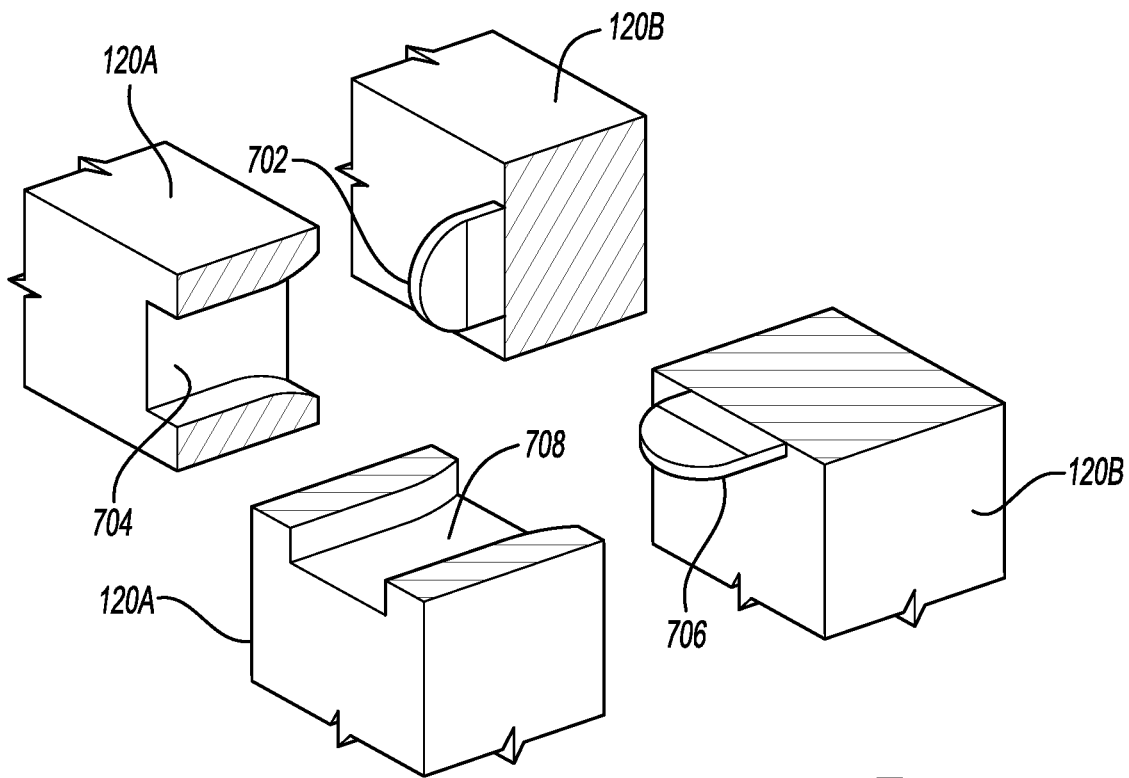
FIG. 7 is a diagram further illustrating exemplary connections between batteries.

FIG. 7 illustrates an exemplary embodiment of self-aligning connectors that may be present on each of the batteries 120. In particular, each battery 120 may include a male self-aligning connector 702 designed to enter a female self-aligning connector 704 of another battery 120, which may progressively narrows vertically. When the male self-aligning connector 702 is fully inside the female self-aligning connector 704, the attached batteries 120A and 120B will be correctly positioned vertically. Similarly, each battery 120 may include a male self-aligning connector 706 that is designed to enter a female self-aligning connector 708 of another battery 120 that progressively narrows horizontally. Thus, when the male self-aligning connector 706 is fully inside the female self-aligning connector 708, the attached batteries 120A and 120B will be correctly positioned horizontally.

Figure 8:
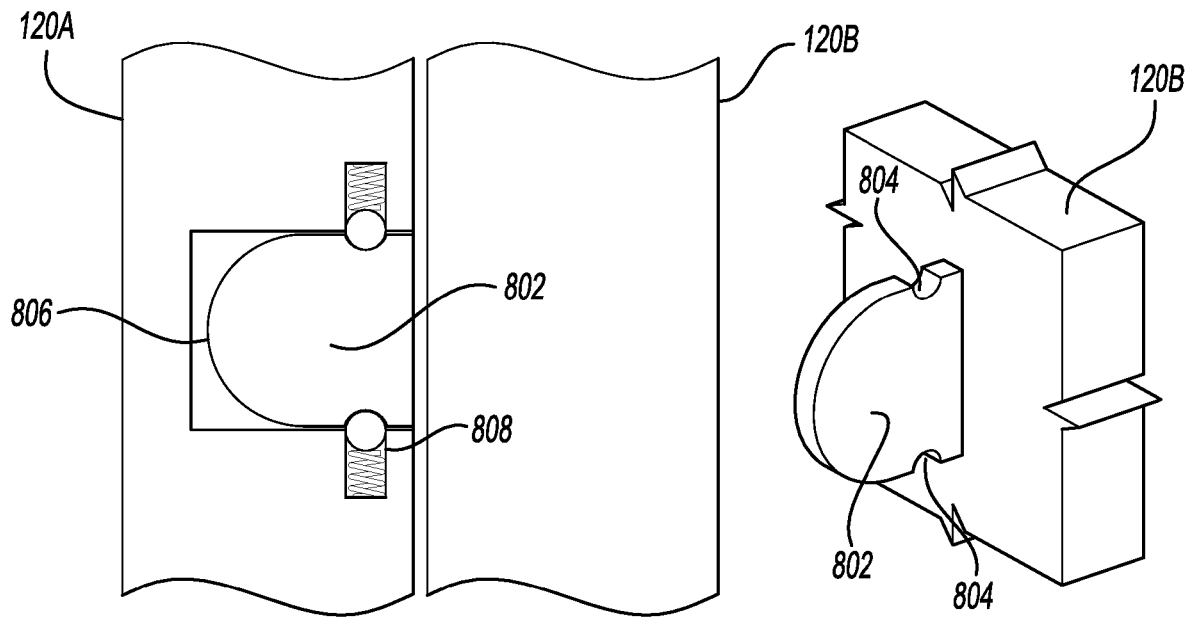
FIG. 8 is a diagram illustrating a locking mechanism for locking adjacent batteries.

FIG. 8 illustrates how two batteries 120 may be locked to one another via their connectors. As shown in the illustrated embodiment, a male connector of each battery 120, such as the vertical self-aligning connector 802 shown in FIG. 8, may include slots 804 on the upper and lower sides as shown. When the vertical self-aligning connector 802 is fully positioned in the female self-aligning connector 806 of another battery 120A, the battery 120A may move pins 808 into the slots 804 of the vertical self-aligning connector 802 to lock the vertical self-aligning connector 802 in place. The pins 808 may be designed to be fail-safe in the sense that no external force is needed for them to be moved into a locked position, and an external actuation is needed, such as responsive to a command signal from one of the controllers 118, 158, to move them out of the slots 804 into an unlocked position.

Figure 9:
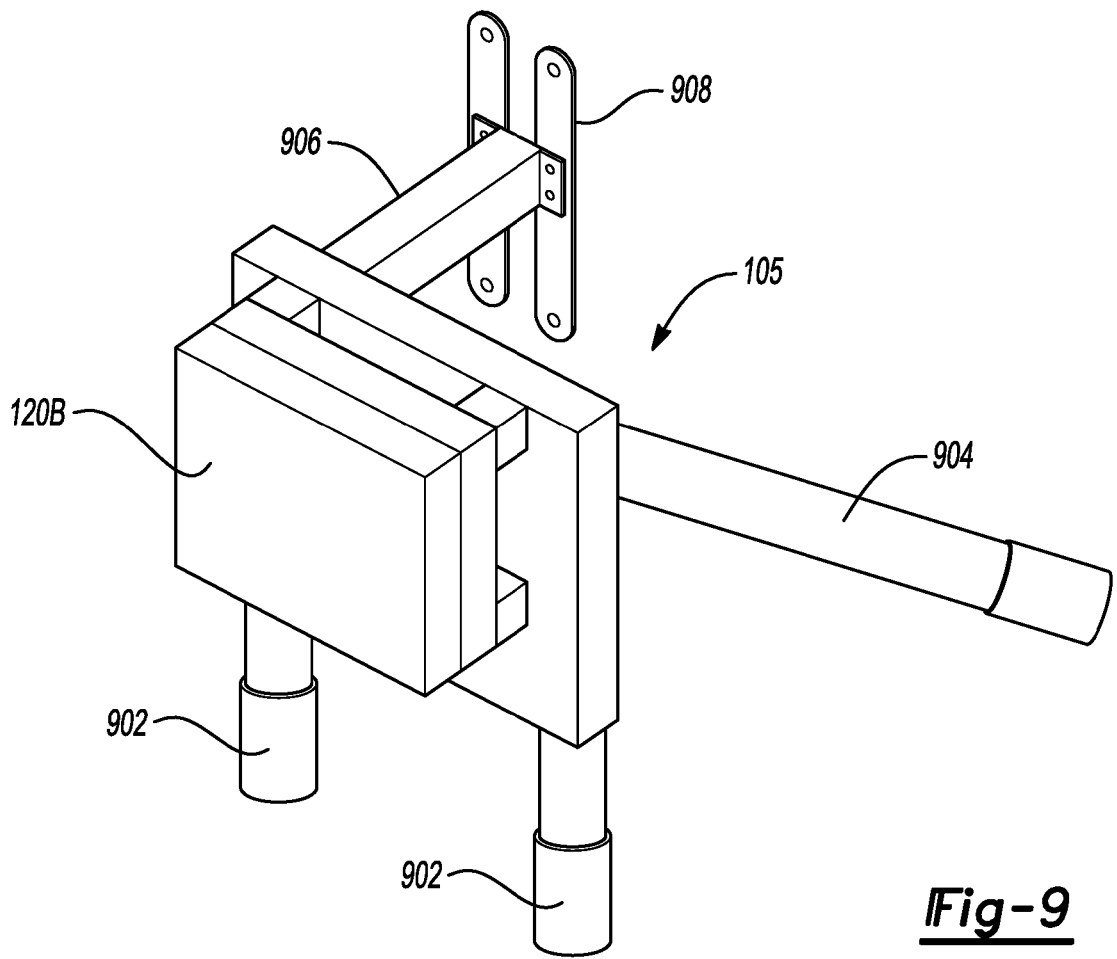
FIG. 9 is a diagram illustrating an exemplary adjustable charging station.

FIG. 9 illustrates an exemplary embodiment of one of the charging stations 105. As shown in the illustrated embodiment, the charging station 105 may hold batteries 120B and may be supported on vertically adjustable posts 902. The charging station 105 may also have a ground mounted support structure 904, which may be configured to adjust to changes in the vertically adjustable posts 902. In addition, or alternatively, to the ground mounted support structure 904, the charging station 105 may include a wall mounted support structure 906. The wall mounted support structure 906 may be configured to move vertically along slots 908 to accommodate changes in the vertically adjustable posts 902. This embodiment allows adjustment of the vertical position of batteries 120B to accommodate vehicles 102 with different heights for their battery swapping systems 114.

Figure 10:
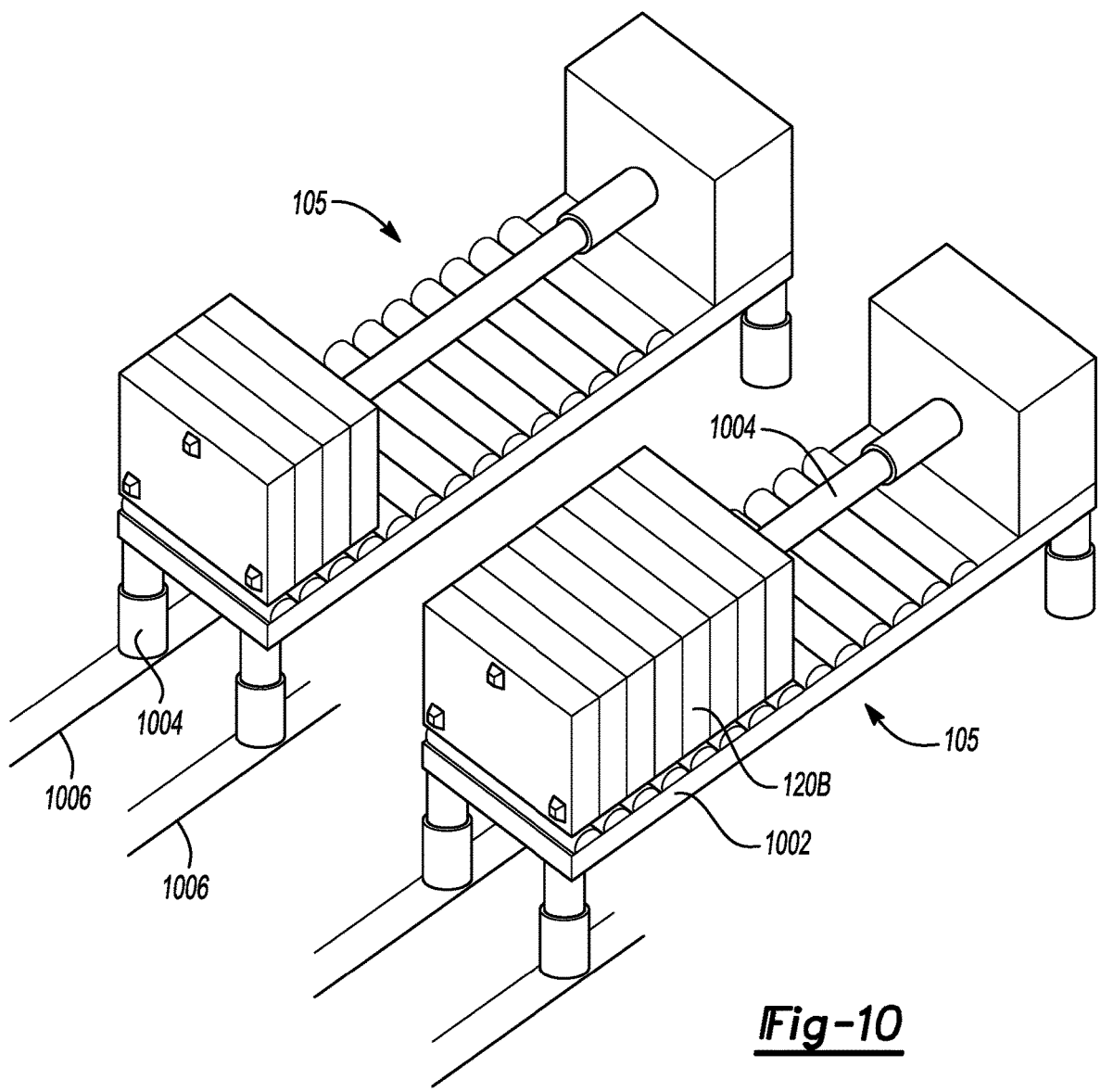
FIG. 10 is a diagram illustrating another exemplary adjustable charging station.

FIG. 10 illustrates another exemplary embodiment of charging stations 105, which may be utilized in a larger scale commercial setting for storing, charging, swapping, sharing, and renting batteries. Specifically, the illustrated charging stations 105 may be part of a battery exchange network, the data for which may be maintained by the server 106 in the charging hub database 166 and the user account database 168. As shown in the illustrated embodiment, batteries 120B on the charging stations 105 may be positioned on rollers 1002, and may be stacked horizontally. The batteries 120B may be movable backwards or forwards using a linear actuator 1004. The height of each charging station 105 may be adjusted using vertical actuators 1006. Tracks 1008 may guide a vehicle 102 to approach the charging stations 105. As described earlier, a vehicle 102 seeking to unload or load a battery 120 to or from a charging station 105 may use its on-board proximity sensors 154, the tracks 1008, and/or homing signals from the charging station 105 sensors to position appropriately and dock its battery swapping system 114 with the outermost battery 120B of the charging station 105. The vehicle 102 or charging station 105 may then appropriately lock or unlock one or more of the outermost batteries 120B of the charging station 105 to the battery swapping system 114 vehicle 102 to affect the desired battery transaction. Each charging station 105 may be connected to the server 106 via the network 110 for logging battery transaction details and making necessary decisions, as described in more detail below.

Figure 11:
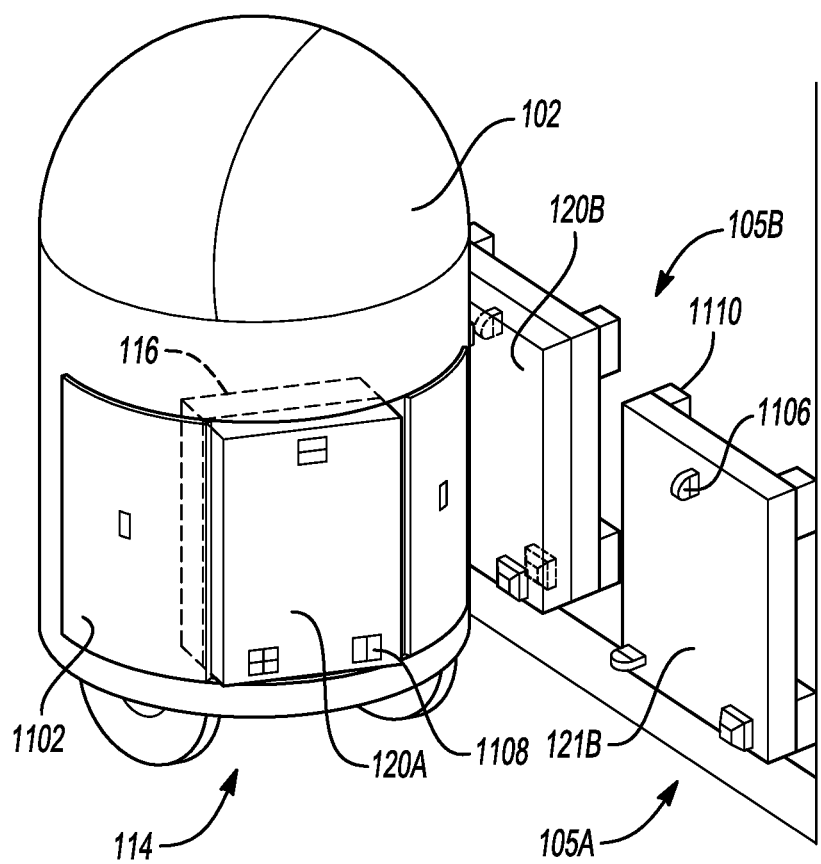
FIG. 11 is a diagram illustrating an electrically powered robotic vehicle swapping one or more batteries with a charging hub.

FIG. 11 illustrates an exemplary embodiment in which the vehicle 102 is a robotic vehicle (or simply robot) having the swappable and stackable battery swapping system 114. The primary power source 116 of the robotic vehicle 102 may be stacked behind the innermost battery 120A of a stack of batteries coupled to a propulsion system 112 of the robotic vehicle 102. As described above in reference to block 208 of the process 200, the swappable batteries 120A may be located behind sliding doors 1102, which may be opened to facilitate battery exchange. As shown in the illustrated embodiment, if the charging station 105A does not include any batteries 120B, the robotic vehicle 102 may be configured to dock the battery swapping system 114 to the battery base 121B of the charging station 105A to unload one or more swapping batteries 120A thereto. The battery base 121B may similarly include a plurality of male connectors 1106 that correspond to several female connectors 1108 on the swappable batteries 120A. The vehicle controller 118 of the robotic vehicle 102 may be configured to utilize the on-board proximity sensors 154 and/or homing signals from the charging station 105A to navigate to and position the outermost swappable battery 120A to dock with the battery base 121B.

The male connectors 1106 may be configured to provide the self-aligning function described earlier by locating within the one or more matching female connectors 1108. One or more of the male connectors 1106 may provide an electrical connection between the batteries 120A and the charging station 105A. One or more of the male connectors 1106 may provide data communication connections between the vehicle controller 118 of the robotic vehicle 102, the swappable batteries 120A, and the charging station 105A. Alternatively, the data communication among the robotic vehicle 102, swappable battery 120A, and charging station 105A may occur through wireless connections. Responsive to the robotic vehicle 102 docking the outermost swappable battery 102A with the battery base 121B, one or more of the outermost batteries 120A may be locked to the battery base 121B and unlocked from the robotic vehicle 102. Thereafter, the robotic vehicle 102 may then proceed to the charging station 105B to pick up a charged battery 120B therefrom. Each of the charging stations 105A and 105B may be connected to an electric power source 162 and/or a computer network, such as the network 110. Each of the charging stations 105A, 105B may further have dampers or isolators 1110 to absorb any excess force during docking to prevent damage to the robotic vehicle 102, the batteries 120, and the charging stations 105.

Figure 12:
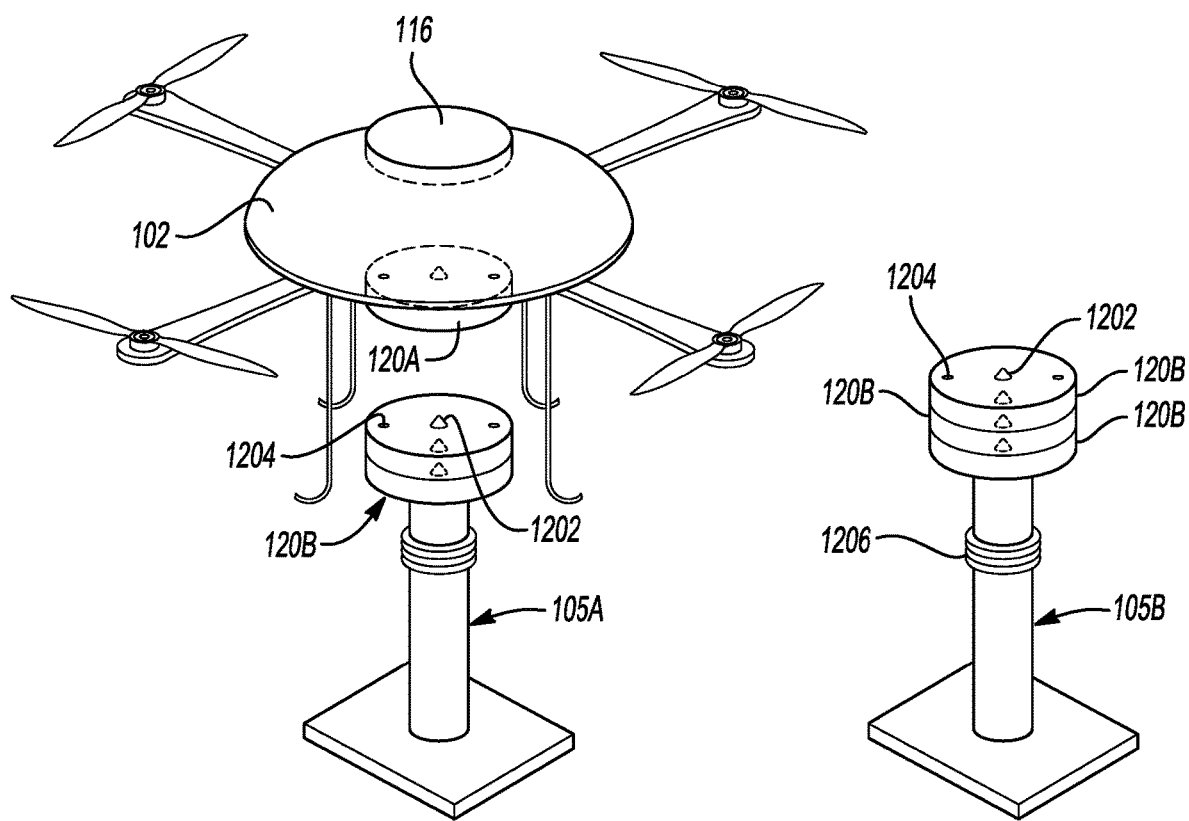
FIG. 12 is a diagram illustrating an electrically powered unmanned aerial vehicle swapping one or more batteries with a charging hub.

FIG. 12 illustrates an exemplary embodiment in which the vehicle 102 is an aerial vehicle or a UAV configured to swap batteries 120 with charging stations 105. As shown in the illustrated embodiment, the UAV 102 may include a primary power source 116 such as a battery at a top end of the UAV 102, and one or more stacked swappable batteries 120A at a bottom end of the UAV 102. Each of the charging stations 105 configured for docking by the UAV 102 may include a battery base on which one or more batteries 120B are stored in a stacked configuration. Each of the batteries 120 may have a male connector 1202 on one stacking face of the battery 120 that corresponds to a female connector on the other stacking face of the battery 120. In the illustrated embodiment, the outermost battery 120B stacked on the charging station 105A includes an exposed male connector 1202, which may correspond to an exposed female connector on the underside of the outermost battery 120A of the vehicle 102.

One of the stacking faces of each battery 120, such as the stacking face that includes the female connector, may also include a magnetic/metal ring surrounding the female connector, and the other stacking face of each battery 120, such as the stacking face that includes the male connector 1202, may have magnets 1204 at select locations on the stacking face around the male connector 1202. The male connector 1202 may have a conical shape with the smaller top point to make it easy for positioning within the complimentary female connector on the underside of the swappable battery 120A Once positioned properly, the joint formed between the male connector 1202 and the corresponding female connector on the swappable battery 120A may establish a failsafe mechanical and electrical joint between the batteries 120, such as via a locking pin extended into the male connector 1202 from the swappable battery 120A. In addition, the magnet gripping action between the magnets 1204 and the ring around the female connector on the swappable battery 120A may further secure the joining.

The vehicle controller 118 may be configured to operate the UAV 102 to the charging station 105A using geographic data generated by the GPS module 148, hub location data received from the server 106, and the proximity data generated by the proximity sensors 154. Thereafter, the vehicle controller 118 may operate the UAV 102 to hover or loiter above the charging station 105A, and then to perform a propulsion down towards the charging station 105A so as to cause the female connector of the swappable battery 120A to set onto the male connector 1202, thereby docking the battery swapping system 114 with the charging station 105. The conical shape of the male connector 1202 may correspond to the female connector in the swappable battery 120A, which may thus have an entry opening larger than the distal end of the male connector 1202, and which may assist in alignment and make docking of the female connector with the male connector 1202 and completing the joint easier. The magnets 1204 may also help with proper positioning of the battery swapping system 14 on the charging station 105A, and may provide gripping action once the docking is complete. Each charging station 105 may include a cushion or damper 1206 on the post of the charging station 105 that helps reduce any impact affect caused when the UAV 102 positions itself onto the charging station 105.

The UAV 102 may be configured to dock its swappable battery 120A with the outermost battery 120B of the charging station 105A to charge its swappable battery 120A and primary power source 116 via a power source 162 coupled to the charging station 105A. Alternatively, the battery swapping system 114 of the UAV 102 may be configured to unload the swappable battery 120A onto to the charging station 105 responsive to the propulsion of the UAV 102 down onto the outermost battery 120B of the charging station 105A, which may cause the battery swapping system 114, or more particularly the swappable battery 120A, to dock with the outermost battery 120B. Thereafter, the swappable battery 120A may be locked to the outermost battery 120B and unlocked from the battery swapping system 114 of the UAV 102, such as via at least one command signal sent to one or more of the swappable battery 120A and the outermost battery 120B from the charging station 105 or the UAV 102. The UAV 102 may then perform a propulsion away from the charging station 105A using its primary power source 116 to disengage from the charging station 105A, leaving the swappable battery 120A behind to be charged by the charging station 105A and later retrieved, such as by another UAV needing additional electrical energy.

Thereafter, the UAV 102 may use its primary power source 116 to position itself over the charging station 105B, and perform a propulsion towards the charging station 105B that causes the battery swapping system 114 to engage the outermost battery 120B on the charging station 105B, which may be fully charged. One or more of the outermost batteries 120B on the charging station 105B may then be locked to the battery swapping system 114 and unlocked from the charging station 105B, as described above. The UAV 102 may then perform a propulsion away from the charging station 105B with the one or more loaded batteries 120B powering the propulsion system 112 of the UAV 102, and may proceed on its mission.

More particularly, the swappable batteries 120A of the UAV 102 may be housed within a cylindrical battery compartment defined and centered in the UAV 102, wherein the longitudinal axis of the cylindrical battery compartment is substantially vertical and parallel with the direction of the propulsion to dock the swappable batteries 120A with a charging station 105. The bottom of the cylindrical battery compartment may include an opening for loading and unloading batteries 120A, and the bottom end of the UAV 102 may include tabs configured during regular flight to swing in under the opening of the cylindrical battery compartment and thus provide additional locking of the swappable batteries 120A within the cylindrical battery compartment. Additionally, or alternatively, a door may enclose the battery compartment to provide additional safety and weather protection. As described above in reference to block 208 of the process 200, responsive to the UAV 102 coming within a predetermined distance of a charging hub 104 to charge or swap one or more of the swappable batteries 120A, the vehicle controller 118 may be configured to cause the tabs and/or door to move out from under the cylindrical battery compartment to allow the docking of the swappable batteries 120A with a charging station 105. In some embodiments, the shape of the batteries 120 and the battery compartment of the UAV 102 may be axisymmetric, and the connector 1202 may also be axisymmetric and centered on one of the stacking faces of each battery 120, to make docking of the UAV 102 with the charging stations 105 independent of the yaw orientation of the UAV 102.

In some embodiments, the UAV 102 may also include an actuator configured to slide the swappable batteries 120A up and down within the cylindrical battery compartment so as to position the bottommost battery 120A at proper location for docking with a charging station 105. The actuator may also function to electrically connect the swappable batteries 120 with the primary power source 116. Each of the swappable batteries 120A and the primary power source 116 may also be connected to the other components of the UAV 102, such as the propulsion system 112, so as to power such other components.

Alternative to the embodiment illustrated in FIG. 12, the swappable batteries 120A of the UAV 102 may be located at a top end of the UAV 102 so as to enable the UAV 102 to dock the swappable batteries 120A with ceiling mounted charging stations 105. In this case, the primary power source 116 may located within the UAV 20 below the swappable batteries 120A, possibly forming a stack with the swappable batteries 120A and/or being at a bottom end of the UAV 102 separated from the swappable batteries 120A. In either case, responsive to the vehicle controller 118 of the UAV 102 operating the UAV 102 to a charging hub 104, such as using geographic data generated by the GPS module 148 and hub location data provided from the remote server 106, the vehicle controller 118 may cause the UAV 102 to align the UAV 102, and correspondingly the swappable batteries 120A, with docking connectors of a charging station 105A above the UAV 102, such as using a loitering or hovering motion of the UAV 102. The vehicle controller 118 may then cause the UAV 102 to perform a propulsion up towards the charging station 105A, which may function to dock the outermost swappable battery 120A of the UAV 102 with the docking connectors of the charging station 105A.

One or more of the swappable batteries 120A of the UAV 102 may then be locked to the charging station 105A. As described above, the locking may be done with male-female electro-mechanical joints and/or failsafe powerful rare earth magnets. Once docked, the swappable batteries 120A and the primary power source 116 on the UAV 102 may be charged through electric wiring in the charging station 105A. Alternatively, the UAV 102 may unlock one or more swappable batteries 120A from its side and leave it in the charging station 105A, and then proceed to pick up one or more charged batteries 120B from another ceiling mounted charging station 105B nearby.

In some embodiments, the vehicle 102 may be a watercraft, such as an underwater vehicle (e.g., a personal submarine, an unmanned underwater vehicle), with a battery swapping system 114 including one or more swappable batteries 120A located at a front end of the underwater vehicle 102, and a primary power source 116 located at a back of the underwater vehicle 102, or vice versa. For such water exposed applications, the battery swapping system 114, the batteries 120A and 120B, and charging stations 105 may be appropriately be designed to be waterproof. The vehicle controller 118 of the underwater vehicle 102 may be configured to utilize proximity data generated by on-board proximity sensors 154, and homing signal communications from wireless transceivers 160 of a charging station 105, which may also be underwater, to locate and approach the charging station 105. Similar to the method described earlier for ground vehicles 102, the vehicle controller 118 may be configured to control or guide the underwater vehicle 102 to perform a propulsion towards a charging station 105A that results in the swappable batteries 120A of the underwater vehicle 102 being docked with the charging station 105A, or more particularly with an outermost battery 120B or battery base 121B of the charging station 105A. One of the controllers 118, 158 may then be configured to transmit one or more command signals that lock one or more of the swappable batteries 120A to the charging station 105A and unlocks the one or more swappable batteries 120A from the underwater vehicle 102.

Thereafter, the vehicle controller 118 may be configured to operate or guide the underwater vehicle 102 to perform a propulsion away from the charging station 105 using its primary power source 116, which may cause the underwater vehicle 102 to disengage from the charging station 105A. The charging station 105A may be connected to a power source 162 and data communication network 110 to enable charging for the one or more unloaded swappable batteries 102A, and to enable communication with the server 106, which may be configured to track the status of batteries 120 in a charging hub database 166, and to track battery usage by various users in the user account database 168. Additional charging stations 105 may be placed at different depths and locations to provide the coverage for uninterrupted operation of the underwater vehicles 102. To this end, after the propulsion away from the charging station 105A, the vehicle controller 118 may be configured to guide or operate the underwater vehicle 102 to another charging station 105B so as to load a charged battery 120B onto the underwater vehicle 102.

The vehicle 102 may be considered as operating in various modes, including a regular operating mode where the vehicle 102 is operating according to its primary purpose, such as transporting goods and/or passengers, under the power of the swappable batteries 120A of the vehicle 102, and a battery swap mode where the vehicle 102 is performing propulsions to interact and exchange batteries 120 with a charging hub 104. At least while the vehicle 102 is in its regular operating mode, the vehicle controller 118 may be configured to manage the charging and discharging of the power sources of the vehicle 102, including the primary power source 116 and the swappable batteries 120A. In this process, the "source battery" may be considered as the battery being discharged to power the vehicle 102, such as the propulsion system 112 and/or other components, and the "sink battery" may be considered as the power source currently being charged.

While the vehicle 102 is operating in the regular operation mode, the vehicle controller 118 may be configured to attempt to discharge the outermost swappable battery 120A at the top of the stack of swappable batteries 120A (e.g., last battery 120A to be added to the vehicle 102, the swappable battery 120A farthest from the battery base 121A) to meet the power requests from the vehicle 102, such as powering the propulsion system 112 and other components of the vehicle 102, and to use any excess power from this swappable battery 120A to first charge the primary power source 116 (if the primary power source 116 is a battery), and then the innermost swappable batteries 120A from the bottom of the stack (e.g., oldest swappable battery 120 relative to being added to the vehicle 102, closest to the battery base 121A). In other words, prior to one or more of the batteries 120A being unloaded from the vehicle 102 onto a charging station 105, the vehicle controller 118 may be configured to power the propulsion system 112 and other vehicle 102 components, and charge the primary power source 116, using one or more of the outermost batteries 120A.

The vehicle controller 118 may be configured to recursively discharge the outermost swappable batteries 120 from the top of the stack, and to charge the primary power source 116 and then innermost swappable batteries 120 at the bottom of stack. In other words, the outermost battery 120A may initially be selected as the source battery, and the primary power source 116 may be initially selected as the sink battery. If the outermost battery 120A is not enough to meet the power requests of the vehicle 102, then the vehicle controller 118 may be configured select a next outermost battery 120A as another source battery, and if the primary power source 116 is fully charged, then the vehicle controller 118 may be configured to select the innermost swappable battery 120A as the next sink battery, and so on. This process may be described as "First-in-First-to-Charge" and "Last-in-First-to-Discharge," and may keep the outermost batteries 120A drained first and ready to be swapped at the next available charging stations 105. The charging stations 105 may use an opposite approach for charging received batteries 120B, namely "Last-in-First-to-Charge," so as to keep the outermost batteries 120B of the charging station 105 charged first and ready to be loaded to an approaching vehicle 102.

In some embodiments, the system 100 may be configured to implement a commercial battery network in which several charging hubs 104 may operate and be connected. Each of the charging hubs 104 may be owned and operated by individual entrepreneurs or businesses or by the battery network operator, and users (e.g., drivers) may subscribe to the battery network to swap, share, or rent batteries 120 from any of the charging hubs 104 of the battery bet work. For each user subscribed to the battery network, a database, such as the user account database 168 connected to the server 106, may have an account record specific to the user that indicates an account balance of the user based on the number of batteries 120 currently rented by the user, and the number, quality, and charge of batteries 120 shared by the user.

In particular, when a subscribed user unloads a swappable battery 120A to a charging station 105 of the commercial battery network, a system 100 component coupled to the network 110, such as the charging station 105, the charging hub 104, or the server 106, may be configured to perform a quick battery health checkup. By the unloaded battery 120A being part of the network, the previous state of the unloaded battery 120A may be stored, such as in the charging hub database 166, and the system component performing the checkup may be configured to compare the current state of the unloaded battery 120A to its previously stored state to note any significant deterioration of the unloaded battery 120A. If the unloaded battery 120A is no longer usable, then the user may be credited for recycling a battery 120, which may be indicated in the user's account record in the user account database 168.

Alternatively, if the unloaded battery 120A has not significantly deteriorated and is still usable, then the system 100 component performing the checkup may be configured to credit the user with a predetermined amount based on the health level of the unloaded battery 120A, which may likewise be indicated in the user's account record in the user account database 168. The system 100 component performing the checkup may also be configured to check the charge level of the unloaded battery 120A, such as by checking the current charge level against the charge level of the battery 120A just before it was loaded by the user, which may be indicated in the previous state information for the battery 120A in the charging hub database 166. The user may then be credited based on the amount of charge present in the unloaded battery 120A, such as via an indication of the credit in the user's account record in the user account database 168. Finally, the system 100 component may also credit the user for one base level battery, which may likewise be indicated in the user's account record in the user account database 168.

If a subscribed user loads a battery 120B that is part of the battery network from a charging station 105, one of the system 100 components, such as the charging station 105, the charging hub 104, or the server 106, may be configured to obtain details of the loaded battery 120B, such as from the charging hub database 166 or the charging station 105, and to debit the user's account for the loaded battery 120B based on the quality and charge level of the loaded battery 120B, which may likewise be indicated in the user's account record in the user account database 168. The system 100 component may then calculate whether the user has net credit or debit in the number of batteries 120, such as based on the user's account record included in the user account database 168. If the user has a credit, the user has shared batteries with the system to lend to other users. In such cases, the system 100 component may be configured to provide a user per day or per hour commission for loaning the batteries. On the other hand, if the user has net negative batteries 120, the user has rented out batteries from the system, and the system 100 component may charge rental fees to the user based on the time period of rental. The owner of the charging station 105 may then be credited for the charge in the battery 120B picked up by a vehicle 102.

One of the system 100 components, such as the server 106 or charging hub 104, may be configured to adjust rental commissions and fees based on supply and demand in the locality or region of each charging hub 104. This helps to ensure that users will share or rent out batteries at different locations based on prices and respond to the marketplace to create an efficient system. The owner of a charging hub 104 may set prices for battery charge ($/kWh) similar to a gas station operator setting fuel prices. The battery charge prices may be more or less based on the location, the energy source, and supply and demand conditions. This market based approach to setting prices ensures efficient markets, makes the system sustainable, and maximizes benefits to the users. The users with a subscription to the commercial battery network may receive the latest information on the available batteries 120 and the battery charge prices at nearby charging hubs 104, on their computers or mobile devices, or via to their vehicle 102 infotainment systems 150.

The battery swapping system 114 of each vehicle 102 may be configured to electrically connect the primary power source 116 and/or the swappable batteries 120 in varying electrical configurations, such as depending on the needs of the vehicle 102. In some embodiments, this electrical configuration may be dynamically changed by the battery swapping system 114 depending on the current needs of the vehicles 102. For instance, when located and/or stacked within the battery swapping system 114, the primary power source 116 and/or swappable batteries 120 may be electrically connected in a parallel or in a series configuration. In addition, the battery swapping system 114 may include relays or switches between the primary power source 116 and/or between each of the swappable batteries 120 that upon activation, such as by the vehicle controller 118, may switch the connections between the primary power source 116 and/or between the swappable batteries 120 to change between a series configuration and a parallel configuration. The type of electronic configuration between the primary power source 116 and/or between the swappable batteries 120 may be selected by the vehicle controller 118 based on the requirements of the overall battery swapping system 114 such as to enhance the overall energy capacity, power capacity, or voltage.

Batteries 120 of an electric vehicle 102 that are swappable and stackable are described herein. This same concept may quite easily be extended to other types of energy storage devices, such as hydrogen containers for fuel cell vehicles and generator sets for range extensible electric vehicles. Moreover, responsive to the vehicle 102 shown in FIG. 1 docking with a charging station 105 coupled to a home or business computer network, users on the network may be enabled to use the vehicle's 102 on-board computing capabilities using an external terminal.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence/lane diagrams, and/or block diagrams. In certain alternative embodiments, the functions, acts, and/or operations specified in the flowcharts, sequence/lane diagrams, and/or block diagrams may be re-ordered, processed serially, and/or processed concurrently consistent with embodiments of the invention. Moreover, any of the flowcharts, sequence/lane diagrams, and/or block diagrams may include more or fewer blocks than those illustrated consistent with embodiments of the invention.

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A vehicle comprising:
   a propulsion system;
   a first battery and second power source powering the propulsion system; and
   a controller configured to
     enable unloading the first battery to a first charging station by propulsion of the vehicle towards and then oppositely away from the first charging station; and
     subsequently enable loading a second battery from a second charging station by propulsion of the vehicle powered by the another power source towards the second charging station,
   wherein the propulsion towards the first charging station is along a stacking axis of stacked batteries on the first charging station, and the propulsion towards the second charging station is along a stacking axis of stacked batteries on the second charging station.

2. The vehicle of claim 1, wherein the controller is configured to, responsive to the vehicle docking the first charging station via the propulsion of the vehicle towards the first charging station, lock the first battery to the first charging station and unlock the first battery from the vehicle.

3. The vehicle of claim 1, wherein the controller is configured, responsive to the vehicle docking with the second charging station via the propulsion of the vehicle towards the second charging station, lock the second battery to the vehicle and unlock the second battery from the second charging station.

4. The vehicle of claim 1, wherein the propulsion towards the first and second charging stations docks the vehicle with the first and second charging stations respectively, and the first and second charging stations are fixed.

5. The vehicle of claim 1, further comprising a stack of electrically connected batteries coupled to the propulsion system and initially including the first battery, wherein the controller is configured, responsive to the vehicle docking the stack with the first charging station via the propulsion towards the first charging station, transmit a first signal to the stack that locks two or more of the batteries of the stack to the first charging station and unlocks the two or more of the batteries from the vehicle.

6. The vehicle of claim 5, wherein pairs of adjacent batteries in the stack include a joint for communicating data between the adjacent batteries and a joint for communicating coolant between the adjacent batteries.

7. The vehicle of claim 1, further comprising guides extending from a position of the first battery prior to being unloaded to a front end or a back end of the vehicle, wherein the controller is configured, prior to the first battery being unloaded from the vehicle, to cause the first battery to slide along the guides to the front end or the back end of the vehicle for unloading to the first charging station.

8. The vehicle of claim 1, further comprising a protective structure between the first battery and the first charging station, wherein the controller is configured to move the protective structure prior to the propulsion of the vehicle towards the first charging station that docks the vehicle with the first charging station.

9. The vehicle of claim 1, further comprising an active suspension for raising and lowering the vehicle, wherein the controller is configured to utilize the active suspension to align the vehicle with the first and second charging stations.

10. The vehicle of claim 1, wherein the first charging station includes a third battery that, responsive to the propulsion of the vehicle towards the first charging station, engages the first battery, and one of the first battery and the fourth battery includes protruding connectors configured to align the first battery with the fourth battery as the vehicle propels towards the first charging station.

11. The vehicle of claim 1, wherein the another power source is a third battery, and prior to the first battery being unloaded from the vehicle, the controller is configured to power the propulsion system and charge the third battery using the first battery.

12. The vehicle of claim 1, wherein each of the first and second batteries comprises two stacking faces each configured to join with one of the stacking faces of another one of the of the batteries, and wherein the two stacking faces of each of the batteries are the largest faces of the battery.

13. The vehicle of claim 1, wherein the first charging station is configured, responsive to the first battery being unloaded to the first charging station:
charge the first battery; and
subsequently load the first battery to another vehicle responsive to a propulsion of the another vehicle towards the first charging station.

14. A method for operating a vehicle including a first battery and another power source powering a propulsion system, comprising:
docking and unloading the first battery to a first charging station by propulsion of the vehicle towards and then away from the first charging station; and
subsequently docking and loading a second battery onto the vehicle from a second charging station by propulsion of the vehicle using the another power source towards the second charging station, wherein the propulsion towards the first charging station is along a stacking axis of batteries on the first charging station and the propulsion towards the second charging station is along a stacking axis of batteries on the second charging station.

15. The method of claim 14, further comprising:
responsive to the vehicle docking the first charging station, and before the propulsion away from the first charging station, locking the first battery to the first charging station and unlocking the first battery from the vehicle; and
responsive to the vehicle docking the second charging station, locking the second battery to the vehicle and unlocking the second battery from the second charging station.

16. The method of claim 15, wherein the first charging station is configured, responsive to the vehicle docking the first charging station, and before the propulsion away from the first charging station, to transmit one or more signals to the first battery that locks the first battery to the first charging station and unlocks the first battery from the vehicle.

17. The method of claim 14, further comprising, prior to the vehicle docking with the first charging station, powering the propulsion system and charging the another power source via the first battery.

18. A vehicle comprising:
a propulsion system;
a first battery, wherein the first battery comprises two stacking faces each configured to join with a stacking face of another battery, and wherein the two stacking faces are the largest faces of the first battery;
another power source powering the propulsion system, and
a controller configured to
enable unloading the first battery to a first charging station by propulsion of the vehicle towards and then oppositely away from the first charging station; and
subsequently enable loading a second battery from a second charging station by propulsion of the vehicle powered by the another power source towards the second charging station.

19. The vehicle of claim 1, wherein the first battery, responsive to the propulsion of the vehicle towards the first charging station, engages a battery base of the first charging station, and the first battery or the first charging station includes protruding connectors configured to align the first battery with the battery base of the first charging station as the vehicle propels towards the first charging station, and wherein the second battery, responsive to the propulsion of the vehicle towards the second charging station, engages a battery base on the vehicle, and the battery base or the second battery includes protruding connectors configured to align the second battery with the battery base as the vehicle propels towards the second charging station.

20. The vehicle of claim 1, wherein the vehicle is an aerial vehicle, and wherein one or more connector elements of the first battery is axisymmetric.

\* \* \* \* \*